(12) United States Patent  
Chen et al.

(10) Patent No.: US 12,021,655 B2
(45) Date of Patent: Jun. 25, 2024

(54) DATA TRANSMISSION METHOD AND APPARATUS

(71) Applicant: HUAWEI TECHNOLOGIES CO., LTD., Guangdong (CN)

(72) Inventors: Qichang Chen, Shenzhen (CN); Min Zha, Shenzhen (CN); Dongdong He, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 160 days.

(21) Appl. No.: 17/682,566

(22) Filed: Feb. 28, 2022

(65) Prior Publication Data

US 2022/0182262 A1 Jun. 9, 2022

Related U.S. Application Data

(63) Continuation of application No. PCT/CN2020/110803, filed on Aug. 24, 2020.

(30) Foreign Application Priority Data

Aug. 30, 2019 (CN) .......................... 201910820899.4

(51) Int. Cl.
*H04L 12/46* (2006.01)
*H04L 12/42* (2006.01)
(Continued)

(52) U.S. Cl.
CPC ........ *H04L 12/4637* (2013.01); *H04L 12/427* (2013.01); *H04L 12/4633* (2013.01);
(Continued)

(58) Field of Classification Search
CPC ............... H04L 12/4637; H04L 12/427; H04L 12/4633; H04L 67/12; H04L 2012/421; H04W 4/40
See application file for complete search history.

(56) References Cited

U.S. PATENT DOCUMENTS 6,594,232 B1 * 7/2003 Dupont ................. H04L 12/437
370/224
7,054,951 B1 * 5/2006 Kao ......................... H04L 12/42
709/251
(Continued)

FOREIGN PATENT DOCUMENTS

CN 102088387 A 6/2011
CN 102299835 A 12/2011
(Continued)

OTHER PUBLICATIONS

Extended European Search Report in European Appln No. 20858971.3, dated Sep. 16, 2022, 8 pages.
(Continued)

*Primary Examiner* — Azizul Choudhury
(74) *Attorney, Agent, or Firm* — Fish & Richardson P.C.

(57) ABSTRACT

Example data transmission methods and apparatus are disclosed. One example method includes receiving a first data packet. When a first ring node detects that a link between the first ring node and a second ring node on a first ring port is faulty, it is determined whether the received first data packet is a wrapped data packet. If the first data packet is a non-wrapped data packet, a second ring port is determined based on the first ring port, the first data packet is wrapped into a wrapped data packet to generate a second data packet, and the second data packet is forwarded through the second ring port.

14 Claims, 12 Drawing Sheets

(51) Int. Cl.
  *H04L 12/427* (2006.01)
  *H04L 67/12* (2022.01)
  *H04W 4/40* (2018.01)
  *H04W 4/48* (2018.01)
(52) U.S. Cl.
  CPC ........ *H04L 2012/421* (2013.01); *H04L 67/12* (2013.01); *H04W 4/40* (2018.02); *H04W 4/48* (2018.02)

(56) References Cited

U.S. PATENT DOCUMENTS

| | | | |
|---|---|---|---|
| 7,376,138 B1* | 5/2008 | Cotter | H04L 47/13 370/223 |
| 7,826,400 B2* | 11/2010 | Sakauchi | H04L 12/437 370/258 |
| 2008/0298231 A1 | 12/2008 | Takakuwa | |
| 2009/0083464 A1 | 3/2009 | Beckhoff et al. | |
| 2009/0103554 A1* | 4/2009 | Akahane | H04L 12/4625 370/406 |
| 2010/0165883 A1 | 7/2010 | Holness et al. | |

FOREIGN PATENT DOCUMENTS

| | | |
|---|---|---|
| CN | 103023771 A | 4/2013 |
| CN | 105141493 A | 12/2015 |
| EP | 1087573 A2 | 3/2001 |
| JP | 2014160951 A | 9/2014 |
| WO | 2016184127 A1 | 11/2016 |

OTHER PUBLICATIONS

Brown et al., IEEE 802.17 Resilient Packet Ring (RPR) Standards Update, Nanog, Feb. 2003, 14 pages.

IEEE Std 802.1CB™—2017, "IEEE Standard for—Local and metropolitan area networks—Frame Replication and Elimination for Reliability," IEEE Computer Society, Oct. 2017, 102 pages.

IEEE Std 802.3™—2018, "IEEE Standard for Ethernet," IEEE Computer Society, Aug. 2018, 5600 pages.

IEEE Std 802.1Q—2018, "IEEE Standard for Local and Metropolitan Area Network—Bridges and Bridged Networks," IEEE Computer Society, Jul. 2018, 1993 pages.

ITU-T G.8032/Y.1344, "Series G: Transmission Systems and Media, Digital Systems and Networks; Packet over Transport aspects—Ethernet over Transport aspects; Series Y: Global Information Infrastructure, Internet Protocol Aspects and Next-Generation Networks, Internet protocol aspects—Transport; Ethernet Ring Protection Switching," Aug. 2015, 82 pages.

PCT International Search Report and Written Opinion issued in International Application No. PCT/CN2020/110803 on Nov. 30, 2020, 15 pages (with English translation).

* cited by examiner

DATA TRANSMISSION METHOD AND APPARATUS

CROSS-REFERENCE TO RELATED APPLICATIONS

This application is a continuation of International Application No. PCT/CN2020/110803, filed on Aug. 24, 2020, which claims priority to Chinese Patent Application No. 201910820899.4, filed on Aug. 30, 2019. The disclosures of the aforementioned applications are hereby incorporated by reference in their entireties.

TECHNICAL FIELD

This application relates to the field of in-vehicle networks, and in particular, to a data transmission method and an apparatus.

BACKGROUND

An in-vehicle network (in-vehicle network) is a network that carries mutual data transmission between devices such as a sensor, a controller, and an actuator in a vehicle. The in-vehicle network requires high reliability, a low latency, a short startup time, simplified wiring, and the like.

With the development of electric and intelligent vehicles, more electronic control units (electronic control unit, ECU) are disposed in vehicles, and mutual communication between electronic control units is more frequent. If point-to-point direct connection is used for networking, a quantity of wiring harnesses in the in-vehicle network increases exponentially, and the weight and cost of the vehicle also increase. In addition, as an advanced driver assisted system (advanced driver assisted system, ADAS) is widely deployed in vehicles, conventional low-rate in-vehicle networks such as a control area network (control area network, CAN), a local interconnect network (local interconnect network, LIN), and FlexRay cannot meet higher transmission bandwidth requirements of sensors in the ADAS. The sensors include an ADAS camera sensor, a laser-induced detection and ranging (laser-induced detection and ranging, LIDAR) sensor, and the like. Therefore, it is a mainstream consensus in the industry to use Ethernet that has large bandwidth and a huge industry ecosystem as a next-generation in-vehicle network.

SUMMARY

This application provides a data transmission method and an apparatus, to resolve a problem of reliability of data transmission using Ethernet in a ring topology in an in-vehicle network and data transmission in the in-vehicle network.

To achieve the foregoing objectives, the following technical solutions are used in this application.

According to a first aspect, this application provides a data transmission method. The method may be applied to a ring node, or the method may be applied to a communications apparatus that can support a ring node in implementing the method. For example, the communications apparatus includes a chip system. The method includes: after a first data packet is received, when a first ring node detects that a link between the first ring node and a second ring node on a first ring port is faulty, determining whether the first data packet is a wrapped data packet; if the first data packet is a wrapped data packet, discarding the first data packet; and if the first data packet is a non-wrapped data packet, determining a second ring port based on the first ring port, generating a second data packet, and forwarding the second data packet through the second ring port. The first ring node is connected to the second ring node through the first ring port, the first ring port is a port through which the first ring node is to send the first data packet, and the second data packet is a wrapped data packet of the first data packet.

In the data transmission method provided in this embodiment of this application, when a single-point link fault occurs in a ring Ethernet-based in-vehicle network, a data packet is allowed to be further transmitted in the in-vehicle network through wrapping, so that the data packet can be further transmitted to a destination device, thereby improving reliability of data transmission in the ring Ethernet-based in-vehicle network. In addition, when a data packet received by a ring node on which a single-point link fault occurs is a wrapped data packet, it indicates that the data packet has been wrapped once, and the data packet is discarded, thereby avoiding unnecessary transmission of the data packet in the ring network.

It should be noted that, the discarding the first data packet may be deleting the first data packet without processing the first data packet.

In a possible implementation, the first data packet includes a wrapped field, and the determining whether the first data packet is a wrapped data packet includes: determining, based on a value of the wrapped field, whether the first data packet is a wrapped data packet; when the value of the wrapped field is a first value, determining that the first data packet is a non-wrapped data packet; and when the value of the wrapped field is a second value, determining that the first data packet is a wrapped data packet.

In another possible implementation, the first data packet includes the wrapped field, and the generating a second data packet includes: setting the value of the wrapped field to the second value to obtain the second data packet, where the second value is used to indicate that a data packet including a wrapped field whose value is the second value is a wrapped data packet.

In another possible implementation, the determining a second ring port based on the first ring port includes: querying a ring port forwarding table based on the first ring port, to determine the second ring port corresponding to the first ring port, where the ring port forwarding table is used to indicate a correspondence between an inbound port and an outbound port, the inbound port represents a port that receives a data packet, the inbound port is a ring port or a service port, and the outbound port represents a ring port for forwarding the data packet in the ring network.

In another possible implementation, after the first data packet is received, the method further includes: querying the ring port forwarding table based on a first inbound port, to determine the first ring port corresponding to the first inbound port, where the first inbound port is a port that receives the first data packet, and the first inbound port is a first service port or the second ring port.

In another possible implementation, after the first data packet is received, the method further includes: determining that a source media access control (media access control, MAC) address is different from a MAC address of the first ring node, querying a ring departure table based on a destination MAC address, to determine a second service port, and forwarding the first data packet through the second service port. The first data packet includes the source MAC address and the destination MAC address. The ring departure service forwarding table is used to indicate a correspondence between a MAC address and an outbound port.

According to a second aspect, this application provides a data transmission method. The method may be applied to a ring node, or the method may be applied to a communications apparatus that can support a ring node in implementing the method. For example, the communications apparatus includes a chip system. The method includes: receiving a second data packet through a third ring port, determining that a source MAC address is the same as a MAC address of a second ring node, determining whether the second data packet is a wrapped data packet, and if the second data packet is a wrapped data packet, determining a fourth ring port based on the third ring port, and forwarding the second data packet through the fourth ring port. The second data packet includes the source MAC address.

In the data transmission method provided in this embodiment of this application, when a single-point link fault occurs in a ring Ethernet-based in-vehicle network, a data packet is allowed to be further transmitted in the in-vehicle network through wrapping, so that the data packet can be further transmitted to a destination device, thereby improving reliability of data transmission in the ring Ethernet-based in-vehicle network. In addition, when a data packet received by a ring node on which a single-point link fault occurs is a wrapped data packet, it indicates that the data packet has been wrapped once, and the data packet is discarded, thereby avoiding unnecessary transmission of the data packet in the ring network.

In a possible implementation, the second ring node is configured with a MAC address of a data source device connected to the second ring node, and the determining that a source MAC address is the same as a MAC address of a second ring node includes: determining that the source MAC address is the same as the MAC address of the data source device connected to the second ring node.

It may be understood that, because the source MAC address is the MAC address of the data source device, and the second ring node prestores the MAC address of the data source device, the second ring node may consider that the MAC address of the data source device is the MAC address of the second ring node, and the received second data packet is a data packet sent by the second ring node. The data source device includes, but is not limited to, an ADAS camera sensor or a laser-induced detection and ranging sensor.

In another possible implementation, the second data packet includes a wrapped field, and the determining whether the second data packet is a wrapped data packet includes: determining, based on a value of the wrapped field, whether the second data packet is a wrapped data packet; when the value of the wrapped field is a first value, determining that the second data packet is a non-wrapped data packet; and when the value of the wrapped field is a second value, determining that the second data packet is a wrapped data packet.

In another possible implementation, the determining a fourth ring port includes: querying a ring port forwarding table based on the third ring port, to determine the fourth ring port corresponding to the third ring port, where the ring port forwarding table is used to indicate a correspondence between an inbound port and an outbound port, the inbound port represents a port that receives a data packet, the inbound port is a ring port or a service port, and the outbound port represents a ring port for forwarding the data packet in the ring network.

According to a third aspect, this application provides a data transmission method. The method may be applied to a ring node, or the method may be applied to a communications apparatus that can support a ring node in implementing the method. For example, the communications apparatus includes a chip system. The method includes: receiving a second data packet through a fifth ring port, determining that a source MAC address is different from a MAC address of a second ring node, determining a sixth ring port based on the fifth ring port, and forwarding the second data packet through the sixth ring port.

In the data transmission method provided in this embodiment of this application, when a single-point link fault occurs in a ring Ethernet-based in-vehicle network, a data packet is allowed to be further transmitted in the in-vehicle network through wrapping, so that the data packet can be further transmitted to a destination device, thereby improving reliability of data transmission in the ring Ethernet-based in-vehicle network. In addition, when a data packet received by a ring node on which a single-point link fault occurs is a wrapped data packet, it indicates that the data packet has been wrapped once, and the data packet is discarded, thereby avoiding unnecessary transmission of the data packet in the ring network.

In a possible implementation, the determining a sixth ring port based on the fifth ring port includes: querying a ring port forwarding table based on the fifth ring port, to determine the sixth ring port corresponding to the fifth ring port.

According to a fourth aspect, this application further provides a communications apparatus, configured to implement the method described in the first aspect. The communications apparatus is a ring node or a communications apparatus supporting the ring node in implementing the method described in the first aspect. For example, the communications apparatus includes a chip system. For example, the communications apparatus includes a receiving unit, a processing unit, and a sending unit. The receiving unit is configured to receive a first data packet. The processing unit is configured to: when a first ring node detects that a link between the first ring node and a second ring node on a first ring port is faulty, determine whether the first data packet is a wrapped data packet, where the first ring node is connected to the second ring node through the first ring port. The processing unit is further configured to: if the first data packet is a wrapped data packet, discard the first data packet. The processing unit is further configured to: if the first data packet is a non-wrapped data packet, determine a second ring port based on the first ring port, where the first ring port is a port through which the first ring node is to send the first data packet. The processing unit is further configured to generate a second data packet, where the second data packet is a wrapped data packet of the first data packet. The sending unit is configured to forward the second data packet through the second ring port.

Optionally, the data transmission method is the same as that in corresponding descriptions in the first aspect. Details are not described herein again.

According to a fifth aspect, this application further provides a communications apparatus, configured to implement the method described in the second aspect. The communications apparatus is a ring node or a communications apparatus supporting the ring node in implementing the method described in the second aspect. For example, the communications apparatus includes a chip system. For example, the communications apparatus includes a receiving unit, a processing unit, and a sending unit. The receiving unit is configured to receive a second data packet through a third ring port, where the second data packet includes a source MAC address. The processing unit is configured to determine that the source MAC address is the same as a MAC address of a second ring node, and determine whether the second data packet is a wrapped data packet. The processing unit is further configured to: if the second data packet is a wrapped data packet, determine a fourth ring port based on the third ring port. The sending unit is configured to forward the second data packet through the fourth ring port.

Optionally, the data transmission method is the same as that in corresponding descriptions in the second aspect. Details are not described herein again.

According to a sixth aspect, this application further provides a communications apparatus, configured to implement the method described in the third aspect. The communications apparatus is a ring node or a communications apparatus supporting the ring node in implementing the method described in the third aspect. For example, the communications apparatus includes a chip system. For example, the communications apparatus includes a receiving unit, a processing unit, and a sending unit. The receiving unit is configured to receive a second data packet through a fifth ring port. The processing unit is configured to: determine that a source MAC address is different from a MAC address of a second ring node, and determine a sixth ring port based on the fifth ring port. The sending unit is configured to forward the second data packet through the sixth ring port.

It should be noted that the function modules in the fourth aspect to the sixth aspect may be implemented by hardware, or may be implemented by hardware executing corresponding software. The hardware or the software includes one or more modules corresponding to the foregoing functions. For example, a transceiver is configured to complete functions of the receiving unit and the sending unit, a processor is configured to complete functions of the processing unit, and a memory is configured to store program instructions used by the processor to perform the method in this application. The processor, the transceiver, and the memory are connected and implement mutual communication by using a bus. For details, refer to functions of behavior of the ring node in the method in the first aspect to the method in the third aspect.

According to a seventh aspect, this application further provides a communications apparatus, configured to implement the method described in the first aspect, the second aspect, or the third aspect. The communications apparatus is a ring node or a communications apparatus supporting the ring node in implementing the method described in the first aspect, the second aspect, or the third aspect. For example, the communications apparatus includes a chip system. For example, the communications apparatus includes a processor, configured to implement the functions in the method described in the first aspect, the second aspect, or the third aspect. The communications apparatus may further include a memory, configured to store program instructions and data. The memory is coupled to the processor, and the processor may invoke and execute the program instructions stored in the memory, to implement the functions in the method described in the first aspect, the second aspect, or the third aspect. The communications apparatus may further include a communications interface, and the communications interface is used by the communications apparatus to communicate with another ring node.

Optionally, the data transmission method is the same as that in corresponding descriptions in the first aspect, the second aspect, or the third aspect. Details are not described herein again.

According to an eighth aspect, this application further provides a computer-readable storage medium, including computer software instructions. When the computer software instructions are run in a communications apparatus, the communications apparatus is enabled to perform the method in the first aspect, the second aspect, or the third aspect.

According to a ninth aspect, this application further provides a computer program product including instructions. When the computer program product runs in a communications apparatus, the communications apparatus is enabled to perform the method in the first aspect, the second aspect, or the third aspect.

According to a tenth aspect, this application provides a chip system. The chip system includes a processor, may further include a memory, and is configured to implement functions of the ring node in the foregoing method. The chip system may include a chip, or may include the chip and another discrete component.

According to an eleventh aspect, this application further provides an in-vehicle network. The in-vehicle network includes: at least three ring nodes, at least one data source device, and a mobile data center. The at least three ring nodes are sequentially connected end to end, the data source device is connected to a first ring node, and the mobile data center is connected to a third ring node.

The data source device is configured to: collect information about an ambient environment of a vehicle, and transmit the information about the ambient environment of the vehicle to the mobile data center.

The first ring node is configured to receive a first data packet through a first service port, where the first data packet includes the information about the ambient environment of the vehicle.

The first ring node is further configured to determine a first ring port based on the first service port, where the first ring port is a port through which the first ring node is to send the first data packet.

The first ring node is further configured to: when it is detected that a link between the first ring node and the third ring node on the first ring port is faulty, determine that the first data packet is a non-wrapped data packet, determine a second ring port based on the first ring port, and generate a second data packet, where the second data packet is a wrapped data packet of the first data packet.

The first ring node is further configured to forward the second data packet through the second ring port.

A second ring node is configured to receive the second data packet through a third ring port.

The second ring node is further configured to: determine that a source MAC address is different from a MAC address of the second ring node, determine a fourth ring port based on the third ring port, and forward the second data packet through the fourth ring port, where the second data packet includes the source MAC address.

The third ring node is configured to receive the second data packet through a fifth ring port.

The third ring node is further configured to determine that the source MAC address is different from a MAC address of the third ring node, determine a second service port, and forward the second data packet through the second service port.

The third ring node is further configured to: when it is detected that the link between the first ring node and the third ring node is faulty, determine that the second data packet is a wrapped data packet, and discard the second data packet.

The mobile data center is configured to receive the second data packet, where the second data packet includes the information about the ambient environment of the vehicle.

The mobile data center is further configured to make a decision in a driving process of the vehicle based on the received information about the ambient environment of the vehicle.

According to a twelfth aspect, this application further provides an in-vehicle network. The in-vehicle network includes: at least three ring nodes, at least one data source device, and a mobile data center. The at least three ring nodes are sequentially connected end to end, the data source device is connected to a first ring node, and the mobile data center is connected to a third ring node.

The data source device is configured to: collect information about an ambient environment of a vehicle, and transmit the information about the ambient environment of the vehicle to the mobile data center.

The first ring node is configured to receive a first data packet through a first service port, where the first data packet includes the information about the ambient environment of the vehicle.

The first ring node is further configured to: determine a first ring port based on the first service port, and send the first data packet through the first ring port, where the first ring port is a port through which the first ring node sends the first data packet.

A second ring node is configured to receive the first data packet through a second ring port.

The second ring node is further configured to determine that a source MAC address is different from a MAC address of the second ring node, and determine a third ring port based on the second ring port, where the first data packet includes the source MAC address.

The second ring node is further configured to: when it is detected that a link between the second ring node and the third ring node on the third ring port is faulty, determine that the first data packet is a non-wrapped data packet, determine the second ring port based on the third ring port, and generate a second data packet, where the second data packet is a wrapped data packet of the first data packet.

The second ring node is further configured to forward the second data packet through the second ring port.

The first ring node is configured to receive the second data packet through the first ring port.

The first ring node is further configured to: determine that the source MAC address is the same as a MAC address of the first ring node, determine that the second data packet is a wrapped data packet, determine a fourth ring port based on the first ring port, and forward the second data packet through the fourth ring port, where the second data packet includes the source MAC address.

The third ring node is configured to receive the second data packet through a fifth ring port.

The third ring node is further configured to determine that the source MAC address is different from a MAC address of the third ring node, determine a second service port, and forward the second data packet through the second service port.

The third ring node is further configured to: when it is detected that the link between the second ring node and the third ring node is faulty, determine that the second data packet is a wrapped data packet, and discard the second data packet.

The mobile data center is configured to receive the second data packet, where the second data packet includes the information about the ambient environment of the vehicle.

The mobile data center is further configured to make a decision in a driving process of the vehicle based on the received information about the ambient environment of the vehicle.

In a possible implementation, two adjacent ring nodes are connected through M Ethernet ports of a same rate, M is an integer, $1 \leq M$, and each Ethernet port is an automotive-grade 10GBASE-T1 port or 25GBASE-T1 port.

In another possible implementation, the ring port is determined by querying a ring port forwarding table by the ring node.

For example, the determining a first ring port based on the first service port includes: querying a ring port forwarding table based on the first service port, to determine the first ring port corresponding to the first service port.

For another example, the determining a second ring port based on the first ring port includes: querying a ring port forwarding table based on the first ring port, to determine the second ring port corresponding to the first ring port.

For another example, the determining a fourth ring port based on the third ring port includes: querying a ring port forwarding table based on the third ring port, to determine the fourth ring port corresponding to the third ring port.

For another example, the determining a second service port includes: querying a ring departure service forwarding table based on a destination MAC address, to determine the second service port, where the second data packet includes the destination MAC address.

In addition, for technical effects of designs of any of the foregoing aspects, refer to the technical effects of the different designs in the first aspect and the second aspect. Details are not described herein again.

In this application, names of the ring node and the communications apparatus constitute no limitation on the devices. During actual implementation, these devices may have other names, and shall fall within the scope of the claims of this application and their equivalent technologies, provided that functions of the devices are similar to those in this application.

DESCRIPTION OF EMBODIMENTS

In the specification, claims, and accompanying drawings of this application, terms such as "first", "second", and "third" are intended to distinguish between different objects but not to limit a particular order.

In the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Specifically, use of the terms such as "example" or "for example" is intended to present a related concept in a specific manner.

First, to make descriptions of the following embodiments clear and concise, related technologies are briefly described below.

With the development of electric and intelligent vehicles, an ADAS is widely deployed in vehicles. The advanced driver assisted system is an intelligent system used to assist and guide a driver during driving. As a result, conventional low-rate in-vehicle networks such as a CAN, a LIN, and FlexRay cannot meet higher transmission bandwidth requirements of sensors in the advanced driver assisted system.

Ethernet (Ethernet) is a computer local area network technology. The Institute of Electrical and Electronics Engineers (Institute of Electrical and Electronics Engineers, IEEE) 802.3 standard is a standard format developed by IEEE for network communication of Ethernet. The latest Ethernet standard document is IEEE 802.3-2018. It specifies content including physical layer connections, electronic signals, and media access layer protocols, and the like. For example, Ethernet includes a plurality of rates ranging from 10 Mbps, 100 Mbps, 1 Gbps, or 2.5 Gbps to 400 Gbps, and supports physical media such as an optical fiber and a copper wire (a twisted pair).

Ethernet-related standards released by the IEEE working group have been widely used in the network industry. Ethernet is widely welcomed by network manufacturers for its simplicity, best-effort transmission mode, and standardized interworking mechanism.

Therefore, it is a mainstream consensus in the industry to use Ethernet that has large bandwidth and a huge industry ecosystem as a next-generation in-vehicle network.

The following describes implementations of the embodiments of this application in detail with reference to the accompanying drawings.

Figure 1:
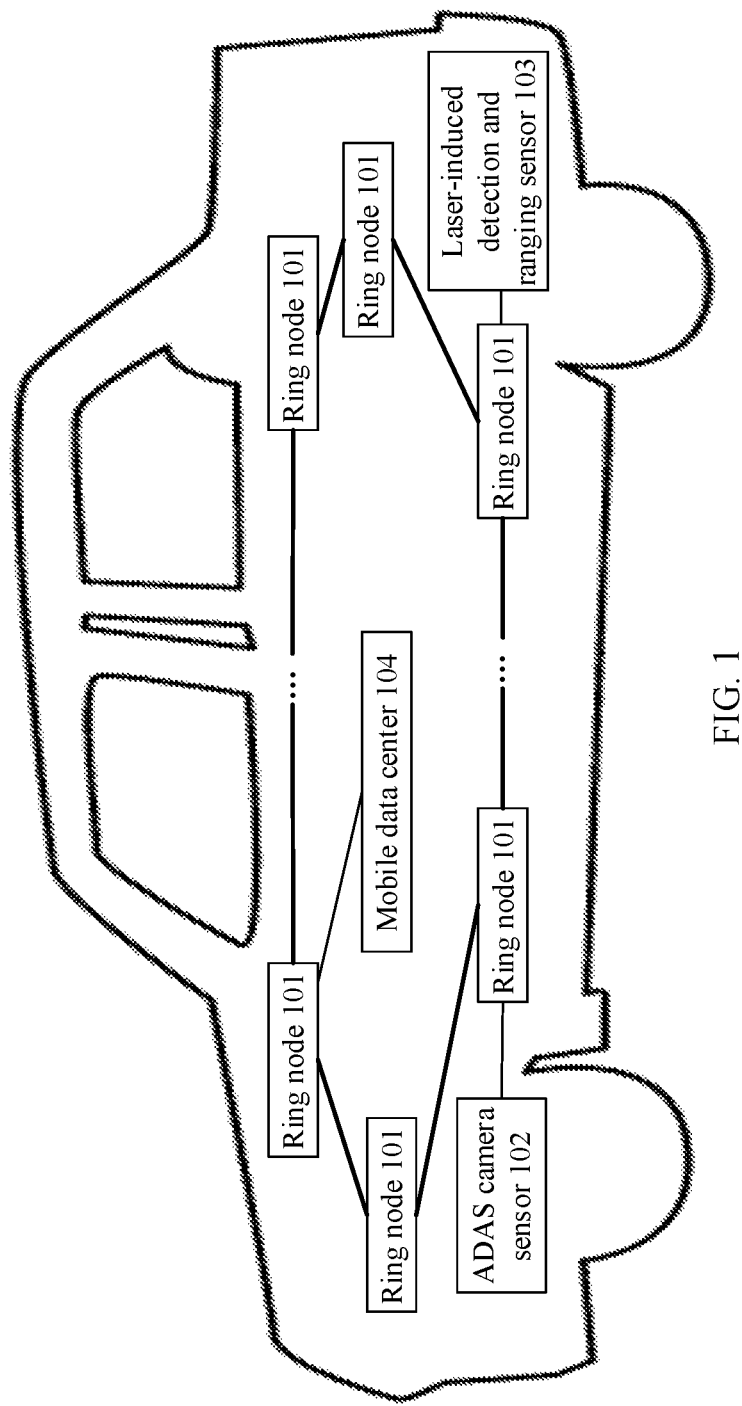
FIG. 1 is an example diagram of an architecture of a ring Ethernet-based in-vehicle network according to this application.

FIG. 1 is an example diagram of an architecture of a ring Ethernet-based in-vehicle network that may be applied to an embodiment of this application. The in-vehicle network includes N ring nodes 101. The N ring nodes 101 are sequentially connected end to end to form a ring network topology, and two adjacent ring nodes 101 are connected through M Ethernet ports of a same rate to form a logical link with large bandwidth.

In some embodiments, N is a positive integer, $3 \leq N \leq 8$, M is an integer, and $1 \leq M \leq 5$. Each Ethernet port may be an automotive-grade 10GBASE-T1 port or 25GBASE-T1 port. In this specification, the Ethernet port may also be referred to as a ring port, and the ring node may also be referred to as a regional communication computing gateway, a gateway, or a forwarding device.

The 10GBASE-T1 port may refer to a 10G Ethernet automotive-grade standard that is being defined by the p802.3ch task group of the IEEE 802.3 standard working group, which uses a twisted pair to transmit Ethernet signals at a rate of 10 Gbps.

The 25GBASE-T1 port may refer to a 25G Ethernet automotive-grade standard, which uses a twisted pair to transmit Ethernet signals at a rate of 25 Gbps.

In addition, the in-vehicle network may further include a data source device (for example, an ADAS camera sensor 102 and a laser-induced detection and ranging sensor 103) and a mobile data center (mobile data center, MDC) 104. The data source device and the mobile data center may be connected to a ring node nearby based on a position in a vehicle body, and data is forwarded by the ring node to the ring network, and is forwarded one or more times to another destination ring node or the mobile data center.

Figure 2:
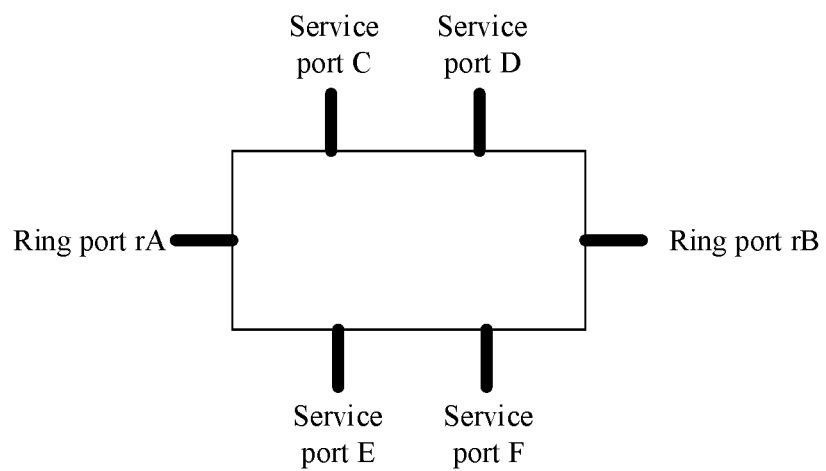
FIG. 2 is an example diagram of a ring node according to an embodiment of this application.

In some embodiments, the ring node further includes service ports, and both the data source device and the mobile data center may be connected to the ring node through the service ports. Data between the data source device and the ring node and between the mobile data center and the ring node is transmitted through the service ports. FIG. 2 is an example diagram of a ring node according to an embodiment of this application. The ring node includes a ring port rA, a ring port rB, a service port C, a service port D, a service port E, and a service port F.

The ADAS camera sensor 102 may be connected to the ring node 101 through any one of the service port C, the service port D, the service port E, and the service port F.

The laser-induced detection and ranging sensor 103 may be connected to the ring node 101 through any one of the service port C, the service port D, the service port E, and the service port F.

The mobile data center 104 may be connected to the ring node 101 through any one of the service port C, the service port D, the service port E, and the service port F.

The mobile data center is a functional unit that is in an intelligent/self-driving vehicle and that is responsible for processing data collected by sensors in an advanced driver assisted system and making a driving decision. The mobile data center may also be referred to as a mobile computing center.

In some embodiments, after service data collected by the data source device is connected to the ring node, the service data may be transmitted into the ring network in a clockwise (clockwise) direction. When the ring network is normal without faults, a data packet is transmitted in the clockwise direction. The data packet includes real-time data collected by the data source device. In this specification, the real-time data may be information about an ambient environment of the vehicle.

In some other embodiments, after service data collected by the data source device is connected to the ring node, the service data may be transmitted into the ring network in a counter-clockwise (counter-clockwise) direction. When the ring network is normal without faults, a data packet is transmitted in the counter-clockwise direction. The data packet includes real-time data collected by the data source device.

In this specification, that the data packet is transmitted on the ring network in the clockwise direction is used as an example for description.

It should be noted that, if a data packet received by the ring node is a data packet in a non-Ethernet format, the ring node may convert the data packet in the non-Ethernet format into a data packet in an Ethernet format. For a specific conversion method, refer to a conventional technology. This is not limited in this application. For example, the ring node converts a received low-voltage differential signal (low-voltage differential signal, LVDS) of the ADAS camera sensor into an Ethernet data signal, and forwards the Ethernet data signal to another ring node. In this specification, the Ethernet format may be an 802.1cb Ethernet frame format or an 802.3 Ethernet frame format.

FIG. 1 is merely a schematic diagram, and the in-vehicle network may further include another data source device, for example, may further include a radio detection and ranging (radio detection and ranging, RADAR) sensor, which is not shown in FIG. 1. Quantities of data source devices and ring nodes included in the in-vehicle network are not limited in this embodiment of this application.

When a single-point link fault occurs in the ring network, a data packet may not be transmitted to a destination device (for example, a ring node or the mobile data center), thereby reducing reliability of data transmission in the ring Ethernet-based in-vehicle network.

The link may be a link between two connected ring nodes in the ring network. The single-point link fault may be a fault occurring at a single physical position on a link between two connected ring nodes. In some other embodiments, the single-point link fault may be a link fault between two connected ring nodes that is caused by a fault of either of the two connected ring nodes.

In some embodiments, the ring node may periodically send a connectivity detection packet to a ring node connected to the ring node. If a connectivity detection response packet is received within a preset duration, it indicates that a link between the two connected ring nodes is normal. If no connectivity detection response packet is received within the preset duration, it indicates that the link between the two connected ring nodes is faulty. The period may be 1 millisecond, 300 microseconds, or the like.

To resolve the foregoing problem, an embodiment of this application provides a data transmission method. The method includes: When a single-point link fault occurs in a ring network, when two ring nodes on two sides adjacent to a fault point detect the fault, it is determined whether a received data packet is a wrapped data packet. If the data packet is a non-wrapped data packet, a port loopback is performed on a ring port in a fault direction, that is, a sending unit of the ring port is looped back to a receiving unit of the ring port, which means that a ring port that receives the data packet is switched into a ring port for sending the data packet. Moreover, the data packet is wrapped into a wrapped data packet, and the wrapped data packet is received from or forwarded to the ring network, so that the wrapped data packet can be transmitted to a destination device, thereby improving reliability of data transmission in a ring Ethernet-based in-vehicle network. If the received data packet is a wrapped data packet, it indicates that the data packet has been wrapped once, and the data packet is discarded, thereby avoiding unnecessary transmission of the data packet in the ring network. The discarding the data packet may be deleting the data packet without processing the data packet.

It should be noted that, the data packet may be a unicast data packet, a multicast data packet, or a broadcast data packet. The unicast data packet is an Ethernet packet sent to a single destination device. The multicast data packet is an Ethernet packet sent to a group of specified destination devices (the devices in the group need to be specified in advance or dynamically configured). The unicast data packet and the multicast data packet may be identified and distinguished by using destination MAC addresses in Ethernet packets.

Next, the data transmission method for a single-point link fault is described in detail with reference to accompanying drawings.

Figure 3A:
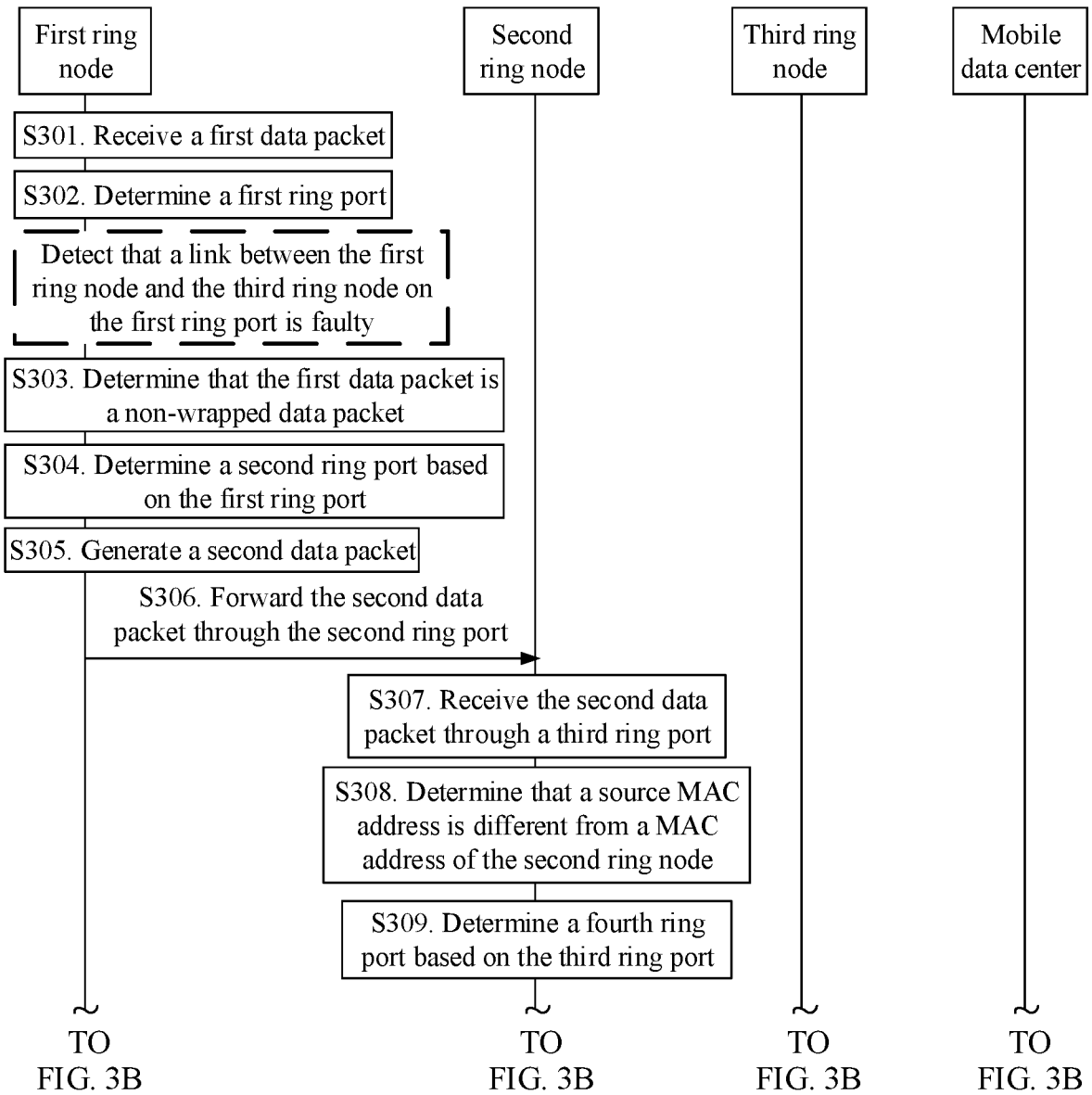
FIG. 3A and FIG. 3B are a flowchart of a data transmission method according to an embodiment of this application.
Figure 3B:
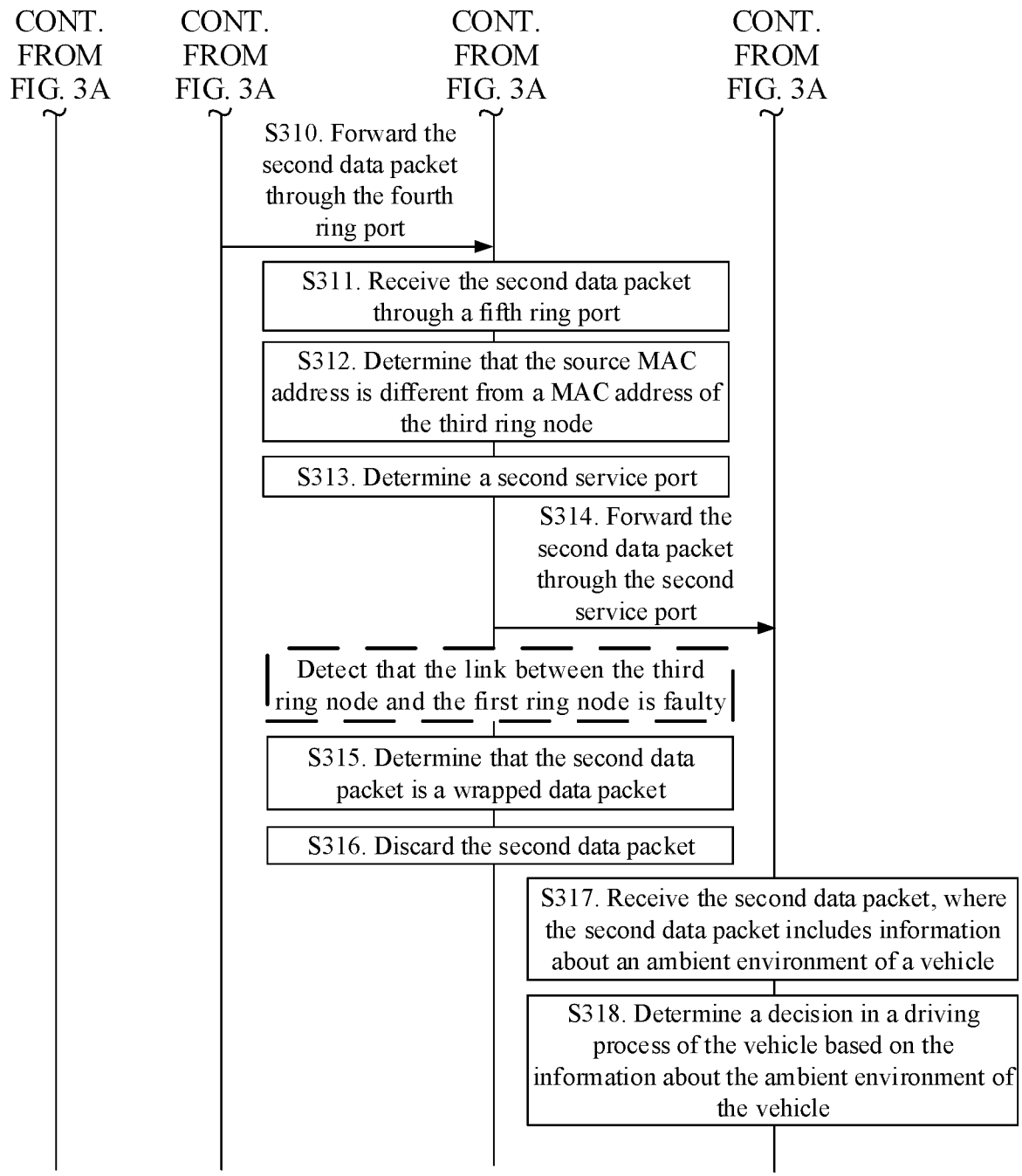

FIG. 3A and FIG. 3B are a flowchart of a data transmission method according to an embodiment of this application. Herein, that a first ring node receives information that is about an ambient environment of a vehicle and that is sent by an ADAS camera sensor is used as an example for description. It is assumed that the first ring node is connected to a third ring node, and a link between the first ring node and the third ring node is faulty. The third ring node is connected to a mobile data center. As shown in FIG. 3A and FIG. 3B, the method may include the following steps.

S301. The first ring node receives a first data packet.

In some embodiments, the first ring node includes a first service port. The first ring node may receive the first data packet through the first service port. For example, the first ring node is connected to the ADAS camera sensor through the first service port. The ADAS camera sensor collects the information about the ambient environment of the vehicle and transmits the information about the ambient environment of the vehicle to the mobile data center. The first ring node may receive, through the first service port, the first data packet sent by the ADAS camera sensor.

In some embodiments, the first data packet sent by the ADAS camera sensor and received by the first ring node may be an Ethernet frame defined in IEEE 802.3.

The Ethernet frame includes a preamble, a start frame delimiter, a destination MAC address, a source MAC address, a first Ethertype (Ethertype), a payload (payload), and a frame check sequence (Frame check sequence, FCS). The preamble is adjacent to the start frame delimiter. The preamble is located before the start frame delimiter. The start frame delimiter is adjacent to the destination MAC address. The start frame delimiter is located before the destination MAC address. The destination MAC address is adjacent to the source MAC address. The destination MAC address is located before the source MAC address. The first Ethertype is adjacent to the payload. The first Ethertype is located before the payload. The payload is adjacent to the FCS. The payload is located before the FCS. In some embodiments, the Ethernet frame may further include a virtual local area network (virtual local area network, VLAN) tag (tag). The VLAN tag is adjacent to the source MAC address. The VLAN tag is located behind the source MAC address. For a structure of the Ethernet frame, refer to definition in IEEE 802.3. The destination MAC address is used to indicate an address of a receiving device that receives the Ethernet frame. The source MAC address is used to indicate an address of the sending device that sends the Ethernet frame. The payload is used to carry data to be transmitted. The frame check sequence is a 32-bit cyclic redundancy check code for verifying whether the data of the Ethernet frame is corrupted. The VLAN tag indicates a VLAN identifier. For example, the VLAN tag may be a customer tag (Customer tag, C-tag), a service tag (Service tag, S-tag), or a backbone tag (Backbone tag, B-tag). For the VLAN tag, refer to IEEE 802.1Q.

The first Ethertype is used to indicate a protocol type of a protocol packet in the payload. The protocol packet is a packet that complies with a specific protocol. The protocol packet may be an IPv4 packet, an address resolution protocol (Address Resolution Protocol, ARP) packet, a point-to-point protocol (Point-to-Point Protocol over Ethernet, PPPoE) packet, or an IPv6 packet. For example, when a value of the first Ethertype is 0x0800, the first Ethertype indicates that the protocol type of the protocol packet in the payload is IPv4. When a value of the first Ethertype is 0x0806, the first Ethertype indicates that the protocol type of the protocol packet in the payload is ARP. When a value of the first Ethertype is 0x8864, the first Ethertype indicates that the protocol type of the protocol packet in the payload is PPPoE. When a value of the first Ethertype is 0x86DD, the first Ethertype indicates that the protocol type of the protocol packet in the payload is IPv6. When a value of the first Ethertype is 0x8847, the first Ethertype indicates that the protocol type of the protocol packet in the payload is a multiprotocol label switching (Multiprotocol Label Switching, MPLS) protocol.

Figure 4:
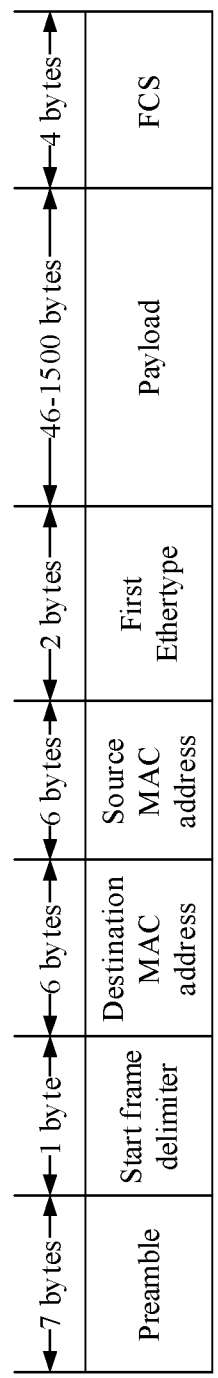
FIG. 4 is an example diagram of a structure of an Ethernet frame according to a conventional technology.

FIG. 4 is an example diagram of a structure of an Ethernet frame according to a conventional technology. The Ethernet frame includes a preamble field, a start frame delimiter field, a destination MAC address field, a source MAC address field, a first Ethertype field, a payload field, and an FCS field. The destination MAC address field is used to carry a destination MAC address. The source MAC address field is used to carry a source MAC address. The first Ethertype field is used to carry a first Ethertype. The payload field is used to carry data. The FCS field is used to carry a check code, for example, a cyclic redundancy check (cyclic redundancy check, CRC) code.

After the first ring node receives the first data packet sent by the ADAS camera sensor, the first ring node may extend the first data packet, and rewrite an IEEE 802.3 Ethernet frame format into an IEEE 802.1cb Ethernet frame format. In some embodiments, a wrapped field is added to the Ethernet frame.

The wrapping may be folded wrapping of reversing or looping back data transmission on a specified port of a node adjacent to a fault in a ring network topology. That is, all data reaching the port is reversely transmitted, and is transmitted on the ring network in a direction completely opposite to an original transmission direction, to avoid a faulty node or a faulty link.

The wrapped field is used to indicate whether a data packet including the wrapped field is a wrapped data packet. When a value of the wrapped field is a first value, it indicates that the data packet including the wrapped field is a non-wrapped data packet. The first value is used to indicate that the data packet including the wrapped field whose value is the first value is a non-wrapped data packet. When the value of the wrapped field is a second value, it indicates that the data packet including the wrapped field is a wrapped data packet. The second value is used to indicate that the data packet including the wrapped field whose value is the second value is a wrapped data packet. In this way, another gateway may identify, based on the wrapped field, whether a received data packet is a wrapped data packet.

In a possible design, when the value of the wrapped field is 0, it indicates that the data packet including the wrapped field is a non-wrapped data packet. When the value of the wrapped field is 1, it indicates that the data packet including the wrapped field is a wrapped data packet. In another possible design, when the value of the wrapped field is 1, it indicates that the data packet including the wrapped field is a non-wrapped data packet. When the value of the wrapped field is 0, it indicates that the data packet including the wrapped field is a wrapped data packet.

In some other embodiments, a second Ethertype field is added to the Ethernet frame. A value of the second Ethertype field may be a value of an Ethertype field that is different from a value of an Ethertype field of an 802.1cb frame and that has not been applied for, for example, 0xF1C2.

Figure 5:
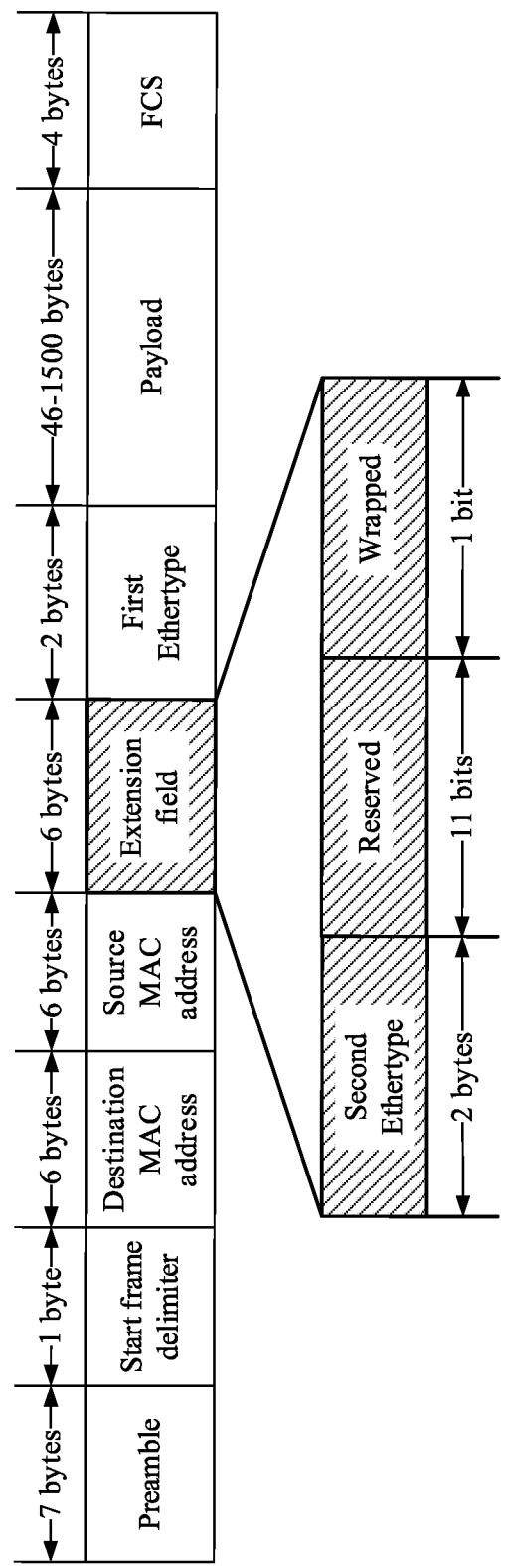
FIG. 5 is an example diagram of a structure of an Ethernet frame according to an embodiment of this application.

FIG. 5 is an example diagram of a structure of an Ethernet frame according to an embodiment of this application. The Ethernet frame includes a preamble field, a start frame delimiter field, a destination MAC address field, a source MAC address field, a second Ethertype field, a reserved field, a wrapped field, a first Ethertype field, a payload field, and an FCS field. The second Ethertype field, the reserved field, and the wrapped field are an extension field of the Ethernet frame. The second Ethertype field is adjacent to the reserved field. The second Ethertype field is located before the reserved field. The reserved field is adjacent to the wrapped field. The reserved field is located before the wrapped field. A length of the second Ethertype field is two bytes. A length of the reserved field is 11 bits. A length of the wrapped field is one bit.

Figure 6:
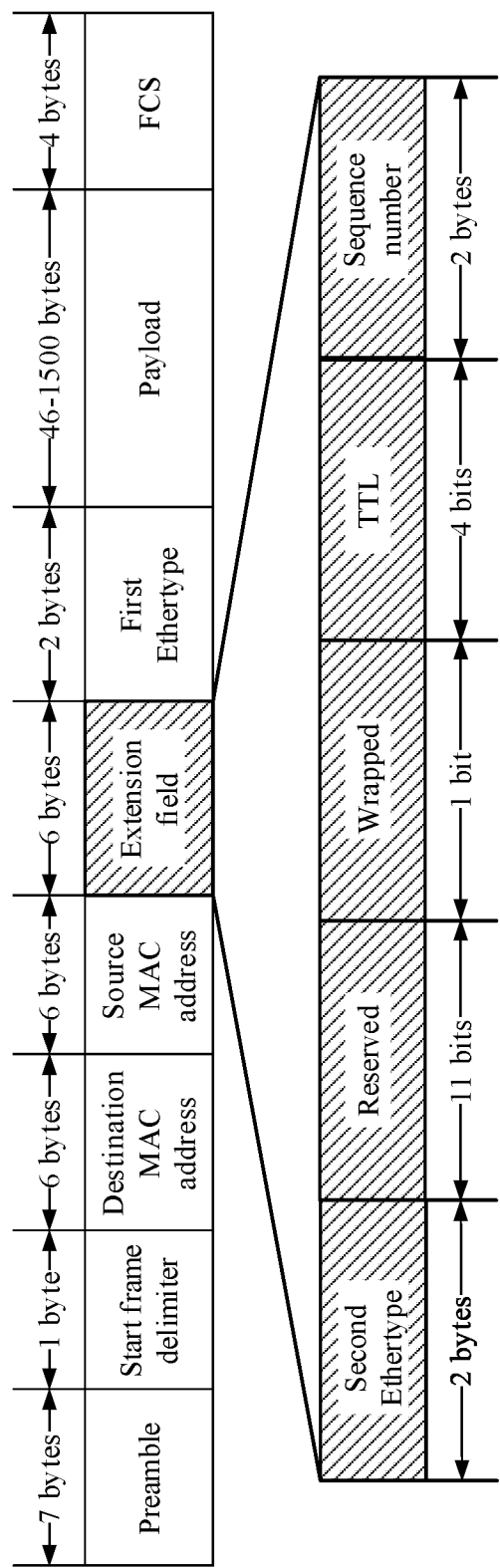
FIG. 6 is an example diagram of a structure of another Ethernet frame according to an embodiment of this application.

In some embodiments, as shown in FIG. 6, the Ethernet frame further includes a time to live (time to live, TTL) field and a sequence number field. The TTL field is adjacent to the wrapped field. The wrapped field is located before the TTL field. The TTL field is adjacent to the sequence number field. The TTL field is located before the sequence number field. A length of the TTL field is four bits. A length of the sequence number field is two bytes. The TTL field is used to control a time to live of a data packet in a network. Each time the packet is forwarded once, a value of the TTL is subtracted by 1 (TTL=TTL−1). If the value of the TTL is 0, the packet is not forwarded but discarded. In this way, bandwidth resources of the ring network are prevented from being wasted by useless forwarding of the data packet in the ring network.

The Ethernet frame provided in this embodiment of this application is compatible with the standard Ethernet frame and 802.1cb frame formats, so that costs and technical complexity of the in-vehicle network can be reduced.

It should be noted that the first data packet may further include the information about the ambient environment of the vehicle. The source MAC address may be a MAC address of the ADAS camera sensor. The destination MAC address may be a MAC address of the mobile data center. The first ring node may prestore the MAC address of the ADAS camera sensor. For another ring node, it may be considered that the received first data packet is sent by the first ring node.

S302. The first ring node determines a first ring port.

In some embodiments, the first ring node may first query a ring departure service forwarding table based on the destination MAC address, to determine a port for forwarding the first data packet.

The ring departure service forwarding table is used to indicate a correspondence between a MAC address and an outbound port. In this specification, the ring departure service forwarding table is generally used to forward a data packet transmitted out of the ring network (leaving the ring network). Entries in the ring departure service forwarding table may be statically configured, or may be obtained through MAC address learning on non-ring ports (for example, the service port C, the service port D, the service port E, and the service port F shown in FIG. 2). MAC address learning is disabled on a ring port. For example, a learned source MAC address in a data packet and a source port of the data packet form a new entry in the ring departure service forwarding table, that is, are used as mapped value of a MAC address and an outbound port in the ring departure service forwarding table.

For example, as shown in Table 1, the correspondence between a MAC address and an outbound port may be presented in a form of a table. In other words, Table 1 presents a correspondence between a MAC address and an outbound port.

TABLE 1

Ring departure service forwarding table

| MAC address | Port bitmap | Next | Description |
|---|---|---|---|
| d8:49:0b:c9:d9:d7 | 000100 | if TTL > 1, query a ring port forwarding table; if TTL = 1, | forward the frame to each port corresponding to a bit 1 in the port bitmap; |
| d8:49:0b:c9:d9:d8 | 001000 | stop forwarding; | |
| d8:49:0b:c9:d9:d9 | 000001 | | |
| Multicast address | 100101 | | |
| Broadcast address | 111111 | | for example, an address of an ARP request type packet, where the packet needs to be forwarded to another gateway on the ring network, and a data source device connected to the another gateway replies to the packet; |
| Unmatched destination MAC address | 000000 | | query the ring port forwarding table; |

The MAC address may be a unicast address, a multicast address, or a broadcast address. If the MAC address is a unicast address, only one bit in the port bitmap is 1, that is, the data packet is forwarded through one outbound port. If the MAC address is a multicast address, at least two bits in the port bitmap are 1, that is, the data packet is forwarded through at least two outbound ports. If the MAC address is a broadcast address, all bits in the port bitmap are 1, that is, the data packet is forwarded through all outbound ports, excluding a port that receives the data packet.

In some embodiments, bits in the port bitmap may respectively correspond to the ring port rA, the ring port rB, the service port C, the service port D, the service port E, and the service port F shown in FIG. 2.

For example, as shown in Table 1, when the MAC address is d8:49:0b:c9:d9:d7, the data packet is forwarded through the service port D. When the MAC address is d8:49:0b:c9:d9:d8, the data packet is forwarded through the service port C. When the MAC address is d8:49:0b:c9:d9:d9, the data packet is forwarded through the service port F. When the MAC address is a multicast address, the data packet is forwarded through the ring port rA, the service port D, and the service port F.

It should be noted that Table 1 merely shows, in a form of a table, a storage form of the correspondence between a MAC address and an outbound port in a storage device, but does not limit the storage form of the correspondence between a MAC address and an outbound port in the storage device. Certainly, the storage form of the correspondence between a MAC address and an outbound port in the storage device may alternatively be another storage form. This is not limited in this embodiment of this application.

In some embodiments, the MAC address in the ring departure service forwarding table stored by the first ring node is a MAC address of a node connected to the first ring node. The first ring node is not connected to the mobile data center, and the first ring node fails to determine, by querying the ring departure service forwarding table based on the destination MAC address, a port for forwarding the first data packet. Therefore, the first ring node queries the ring port forwarding table.

In some other embodiments, when the first data packet is a multicast packet, and needs to be transmitted to a ring node that is not connected to the first ring node, a port for forwarding the first data packet may not be determined by querying the ring departure service forwarding table based on the destination MAC address, either.

In this embodiment, it is assumed that the first ring node queries the ring departure service forwarding table and fails to determine a port for forwarding the first data packet, and the first ring node queries the ring port forwarding table based on the first service port, to determine a port for forwarding the first data packet.

The ring passthrough table (ring port FDB) is used to indicate a correspondence between an inbound port and an outbound port. The inbound port represents a port that receives a data packet. The inbound port is a ring port or a service port. The outbound port represents a port for forwarding the data packet in the ring network. In this specification, the ring port forwarding table is used to forward data packets transmitted into the ring network and transmitted on the ring network. Entries in the ring port forwarding table may be statically configured.

For example, as shown in Table 2, the correspondence between an inbound port and an outbound port may be presented in a form of a table. In other words, Table 2 presents a correspondence between an inbound port and an outbound port.

TABLE 2

Ring port forwarding table

| Inbound port | Outbound port | TTL update rule and test condition | Next | Description |
|---|---|---|---|---|
| rA | rB | TTL = TTL − 1 | if a data packet carries a wrapped field, and a value of the | a transit data packet that is received through the ring port rA and that is not transmitted out of the ring network is forwarded through the ring port rB; |

TABLE 2-continued

Ring port forwarding table

| Inbound port | Outbound port | TTL update rule and test condition | Next | Description |
|---|---|---|---|---|
| rB | rA | TTL = TTL − 1 | wrapped field is 1, indicating that the data packet is a wrapped data packet, stop forwarding; | a transit data packet that is received through the ring port rB and that is not transmitted out of the ring network is forwarded through the ring port rA; |
| C | rB | TTL = k, where k is a quantity of gateway hops in the ring network − 1; | | a data packet received through the service port C is forwarded through the ring port rB; |
| D | rB | | | a data packet received through the service port D is forwarded through the ring port rB; |
| E | rB | | | a data packet received through the service port E is forwarded through the ring port rB; |
| F | rB | | | a data packet received through the service port F is forwarded through the ring port rB; |

It should be noted that, if two adjacent ring nodes are connected through rAT, rA2, and rA3, and rB1, rB2, and rB3, a forwarding rule similar to above is used. Specifically, one ring node includes the ring port rAT, the ring port rA2, and the ring port rA3, and the other ring node includes the ring port rB1, the ring port rB2, and the ring port rB3. The two ring nodes are connected through the ring port rA1 and the ring port rB1, the ring port rA2 and the ring port rB2, and the ring port rA3 and the ring port rB3. For example, a transit data packet that is received through the ring port rA1 and that is not transmitted out of the ring network is forwarded through the ring port rB1. A transit data packet that is received through the ring port rA2 and that is not transmitted out of the ring network is forwarded through the ring port rB2. A transit data packet that is received through the ring port rA3 and that is not transmitted out of the ring network is forwarded through the ring port rB3.

Table 2 merely shows, in a form of a table, a storage form of the correspondence between an inbound port and an outbound port in the storage device, but does not limit the storage form of the correspondence between an inbound port and an outbound port in the storage device. Certainly, the storage form of the correspondence between an inbound port and an outbound port in the storage device may alternatively be another storage form. This is not limited in this embodiment of this application.

In addition, a mechanism of decreasing the TTL hop by hop is implemented in the ring network to terminate and eliminate a packet in time, thereby reducing unnecessary bandwidth waste and avoiding a broadcast storm. An initial value of the TTL may be set to the quantity of gateway hops in the ring network-1. After wrapping, the value of the TTL may be reset to prevent a wrapped packet from being terminated and removed earlier and failing to reach a destination device.

In this embodiment, it is assumed that the first ring node queries the ring port forwarding table based on the first service port (for example, the service port C), and determines the first ring port (for example, the ring port rB), corresponding to the first service port, of the first ring node. The first ring port is a port through which the first ring node is to send the first data packet, and the first ring node includes the first ring port.

However, the first ring node detects that the link between the first ring node and the third ring node on the first ring port is faulty, and S303 to S314 are performed.

S303. The first ring node determines that the first data packet is a non-wrapped data packet.

In some embodiments, the first ring node may determine, based on the value of the wrapped field, whether the first data packet is a wrapped data packet. In this embodiment, it is assumed that the value of the wrapped field is the first value, and it is determined that the first data packet is a non-wrapped data packet.

S304. The first ring node determines a second ring port based on the first ring port.

In some embodiments, the first ring port controls a sending unit of the first ring port to connect to a receiving unit of the first ring port, which indicates that the first ring port is switched into a port that receives the first data packet. A loopback occurrence point may be located on a media independent interface (media independent interface, MII) port at a MAC layer of the ring port. A 10G ring port is used as an example. Connection between a sending unit and a receiving unit on the same port is connecting 32 data transmission lines (such as TXD<0>, TXD<1>, . . . , and TXD<31>) on an XG MII (such as a 10G MII) port at a MAC layer of the 10G port to 32 corresponding data reception lines (such as RXD<0>, RXD<1>, . . . , and RXD<31>), and connecting four control signal transmission lines (such as TXC<0>, TXC<1>, TXC<2>, and TXC<3>) to four corresponding control signal reception lines (such as RXC<0>, RXC<1>, RXC<2>, and RXC<3>).

Then, the first ring node may query the ring port forwarding table based on the first ring port, to determine the second ring port, corresponding to the first ring port, of the first ring node.

S305. The first ring node generates a second data packet.

In some embodiments, the first data packet includes the wrapped field, and the value of the wrapped field is set to the second value, to obtain the second data packet. The second data packet is a wrapped data packet of the first data packet.

It should be noted that a sequence of steps in the data transmission method provided in this embodiment of this application may be properly adjusted, or steps may be correspondingly added or subtracted based on a situation. For example, a sequence between S304 and S305 may be interchanged, that is, the second data packet may be generated first, and then the second ring port is determined based on the first ring port. Any variation to the method that can be easily figured out by a person skilled in the art within the technical scope disclosed in this application shall fall within the protection scope of this application. Therefore, details are not described.

S306. The first ring node forwards the second data packet through the second ring port.

S307. A second ring node receives the second data packet through a third ring port.

In some embodiments, no other ring node exists between the first ring node and the second ring node, that is, the third ring port of the second ring node is connected to the second ring port of the first ring node. The second data packet is not forwarded by another ring node, and the second ring node receives, through the third ring port, the second data packet that is forwarded by the first ring node through the second ring port.

In some other embodiments, another ring node exists between the first ring node and the second ring node, that is, the third ring port of the second ring node is not directly connected to the second ring port of the first ring node. The second data packet is forwarded by the another ring node, and the second ring node receives the second data packet through the third ring port. After receiving the second data packet, the another ring node may forward the second data packet with reference to a description of forwarding the second data packet by the second ring node.

S308. The second ring node determines that the source MAC address is different from a MAC address of the second ring node.

Because the source MAC address is the MAC address of the ADAS camera sensor, the source MAC address is different from the MAC address of the second ring node.

S309. The second ring node determines a fourth ring port based on the third ring port.

In some embodiments, the second ring node may first query a ring departure service forwarding table based on the destination MAC address, to determine a port for forwarding the second data packet.

A MAC address in the ring departure service forwarding table stored by the second ring node is a MAC address of a node connected to the second ring node. The second ring node is not connected to the mobile data center, and the second ring node fails to determine, by querying the ring departure service forwarding table based on the destination MAC address, a port for forwarding the second data packet. Therefore, the second ring node queries a ring port forwarding table.

In this embodiment, it is assumed that the second ring node queries the ring departure service forwarding table, and fails to determine a port for forwarding the second data packet. The second ring node may query the ring port forwarding table based on the third ring port, and determine the fourth ring port corresponding to the third ring port. The second ring node includes the fourth ring port. The fourth ring port is a port through which the second ring node is to send the second data packet. S310 is performed.

S310. The second ring node forwards the second data packet through the fourth ring port.

S311. The third ring node receives the second data packet through a fifth ring port.

In some embodiments, no other ring node exists between the third ring node and the second ring node, that is, the fourth ring port of the second ring node is connected to the fifth ring port of the third ring node. The second data packet is not forwarded by another ring node, and the third ring node receives, through the fifth ring port, the second data packet that is forwarded by the second ring node through the fourth ring port.

In some other embodiments, another ring node exists between the third ring node and the second ring node, that is, the fourth ring port of the second ring node is not directly connected to the fifth ring port of the third ring node. The second data packet is forwarded by the another ring node, and the third ring node receives the second data packet through the fifth ring port. After receiving the second data packet, the another ring node may forward the second data packet with reference to the description of forwarding the second data packet by the second ring node.

S312. The third ring node determines that the source MAC address is different from a MAC address of the third ring node.

Because the source MAC address is the MAC address of the ADAS camera sensor, the source MAC address is different from the MAC address of the third ring node.

S313. The third ring node determines a second service port.

In some embodiments, the third ring node may first query a ring departure service forwarding table based on the destination MAC address, to determine a port for forwarding the second data packet.

A MAC address in the ring departure service forwarding table stored by the third ring node is a MAC address of a node connected to the third ring node. It is assumed that the third ring node is connected to the mobile data center, and the third ring node queries the ring departure service forwarding table based on the destination MAC address, and determines the second service port. The destination MAC address is the MAC address of the mobile data center. The second service port is a port for forwarding the second data packet. S314 is performed.

S314. The third ring node forwards the second data packet through the second service port.

Further, the third ring node detects that the link between the third ring node and the first ring node is faulty, and S315 and S316 are performed. The third ring node may be connected to the first ring port of the first ring node through a sixth ring port. The third ring node may detect that the link between the third ring node and the first ring node on the sixth ring port is faulty.

S315. The third ring node determines that the second data packet is a wrapped data packet.

In some embodiments, the third ring node may determine, based on the value of the wrapped field, whether the second data packet is a wrapped data packet. In this embodiment, it is assumed that the value of the wrapped field is the second value, and it is determined that the second data packet is a wrapped data packet.

S316. The third ring node discards the second data packet.

In this specification, the discarding the second data packet may be deleting the second data packet without processing the second data packet.

S317. The mobile data center receives the second data packet, where the second data packet includes the information about the ambient environment of the vehicle.

S318. The mobile data center determines a decision in a driving process of the vehicle based on the information about the ambient environment of the vehicle.

Decisions in a driving process of the vehicle include, but are not limited to, acceleration, deceleration, turning, lane changing, and stopping action decisions.

In the data transmission method provided in this embodiment of this application, when a single-point link fault occurs in a ring Ethernet-based in-vehicle network, a data packet is allowed to be further transmitted in the in-vehicle network through wrapping, so that the data packet can be further transmitted to a destination device, thereby improving reliability of data transmission in the ring Ethernet-based in-vehicle network. In addition, when a data packet received by a ring node on which a single-point link fault occurs is a wrapped data packet, it indicates that the data packet has been wrapped once, and the data packet is discarded.

Figure 7:
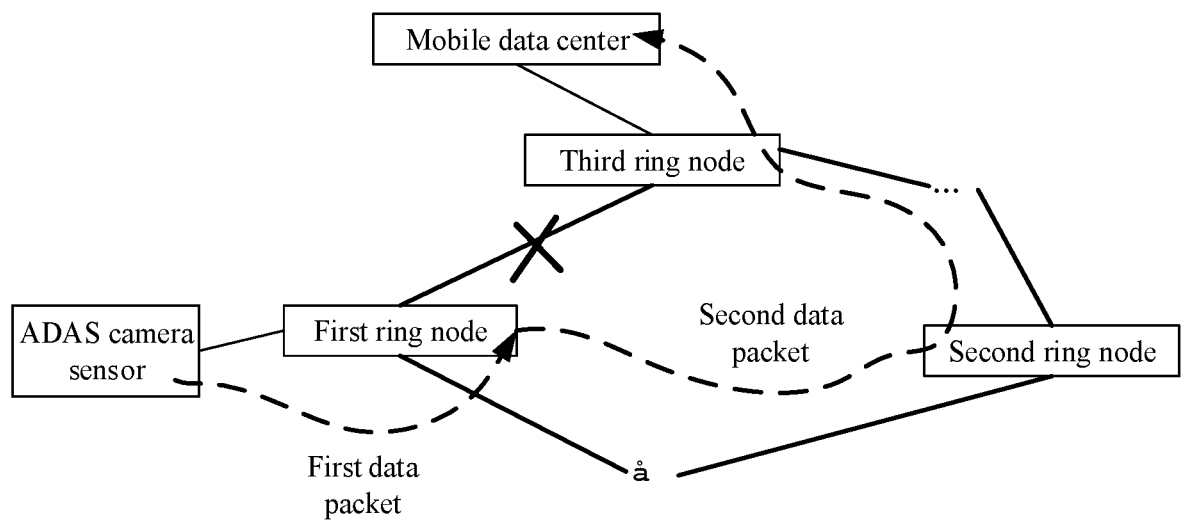
FIG. 7 is an example diagram of data transmission of a ring Ethernet-based in-vehicle network according to an embodiment of this application.

FIG. 7 is an example diagram of data transmission of a ring Ethernet-based in-vehicle network according to an embodiment of this application. As shown in the figure, a first ring node is connected to a third ring node in a clockwise direction, and the first ring node is connected to the third ring node in a counter-clockwise direction through at least one ring node. A link between the first ring node and the third ring node is faulty. A mobile data center is connected to the third ring node. An ADAS camera sensor is connected to the first ring node. After receiving a first data packet sent by the ADAS camera sensor, the first ring node needs to transmit the first data packet to the mobile data center in the clockwise direction. However, the first ring node detects that the link between the first ring node and the third ring node on a first ring port is faulty. The first ring node wraps the first data packet to obtain a second data packet, and forwards the second data packet through a second ring node and the third ring node, to transmit the second data packet to the mobile data center. For specific explanations, refer to the descriptions in the foregoing embodiments. Details are not described herein again.

Figure 8A:
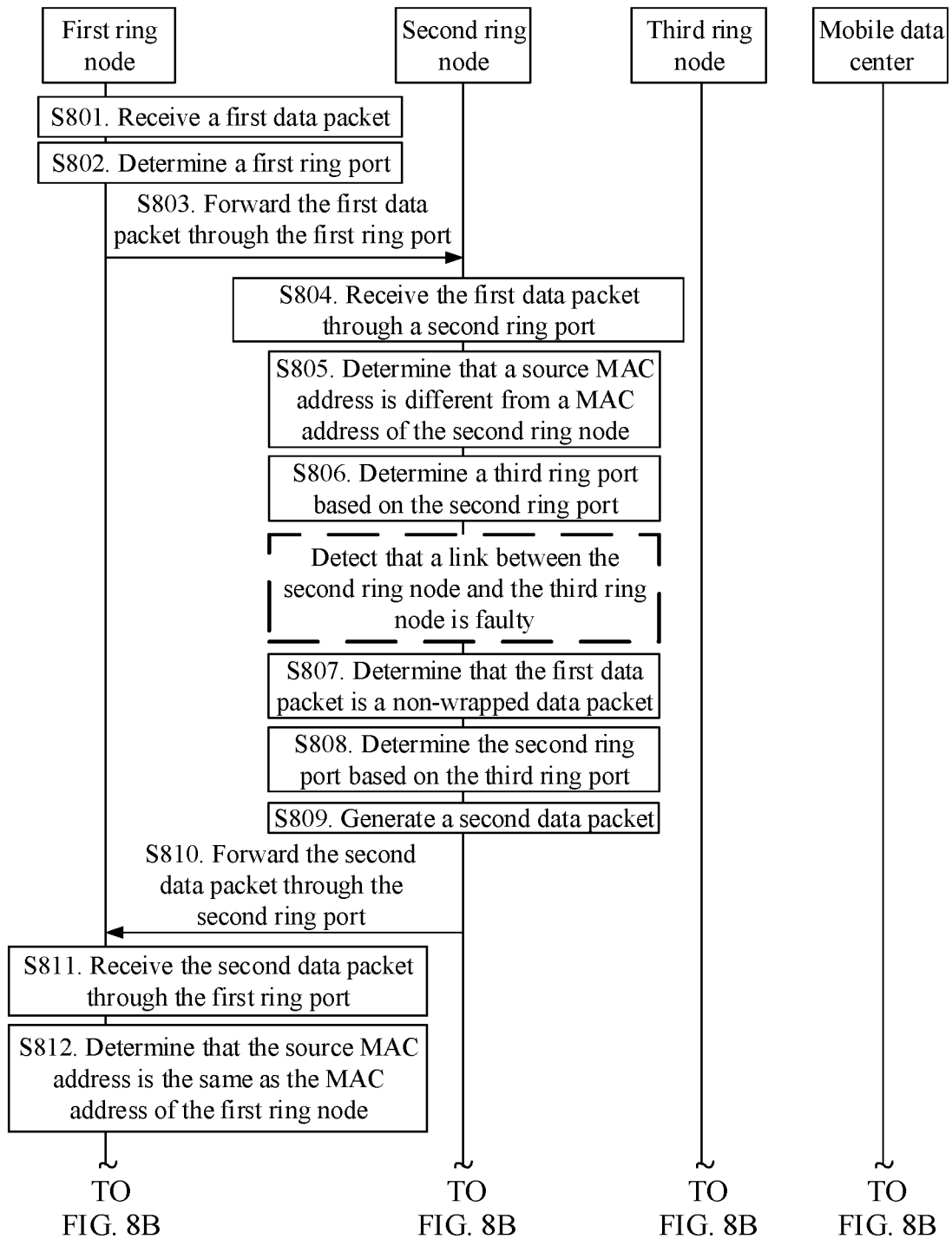
FIG. 8A and FIG. 8B are a flowchart of another data transmission method according to an embodiment of this application.
Figure 8B:
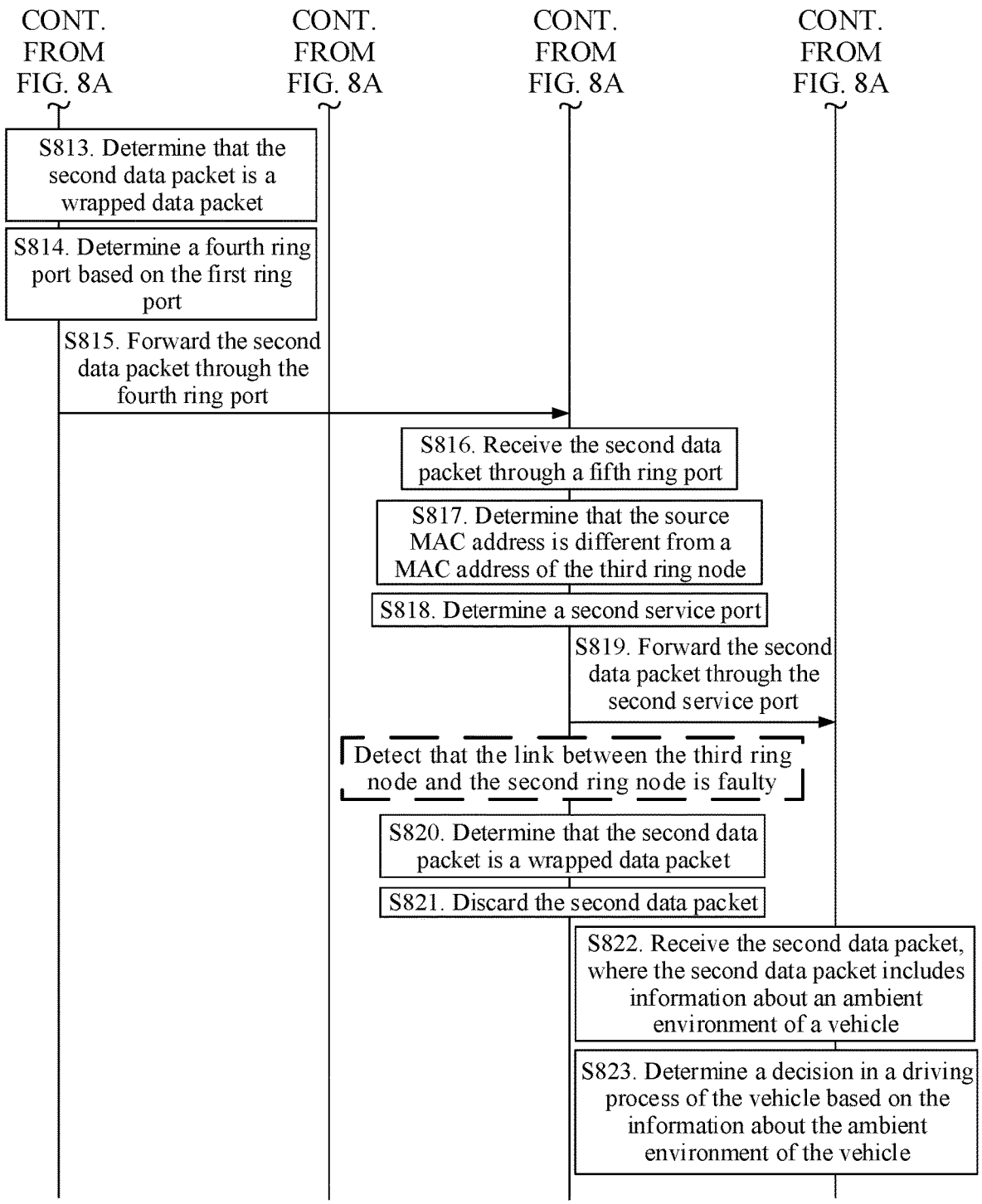

FIG. 8A and FIG. 8B are a flowchart of a data transmission method according to an embodiment of this application. Herein, that a first ring node receives information that is about an ambient environment of a vehicle and that is sent by a laser-induced detection and ranging sensor is used as an example for description. It is assumed that a second ring node is connected to a third ring node, and a link between the second ring node and the third ring node is faulty. The third ring node is connected to a mobile data center. As shown in FIG. 8A and FIG. 8B, the method may include the following steps.

S801. The first ring node receives a first data packet.

In some embodiments, the first ring node includes a first service port. The first ring node may receive the first data packet through the first service port. For example, the first ring node is connected to the laser-induced detection and ranging sensor through the first service port. The laser-induced detection and ranging sensor collects the information about the ambient environment of the vehicle and transmits the information about the ambient environment of the vehicle to the mobile data center. The first ring node may receive, through the first service port, the first data packet sent by the laser-induced detection and ranging sensor.

In some embodiments, the first data packet sent by the laser-induced detection and ranging sensor and received by the first ring node may be an Ethernet frame defined in IEEE 802.3.

After the first ring node receives the first data packet sent by the laser-induced detection and ranging sensor, the first ring node may extend the first data packet, and rewrite an IEEE 802.3 Ethernet frame format into an IEEE 802.1cb Ethernet frame format. In some embodiments, a wrapped field is added to the Ethernet frame.

For detailed explanations of the Ethernet frame, the IEEE 802.1cb Ethernet frame format, and the first data packet, refer to descriptions in S301. Details are not described again.

It should be noted that the first data packet may further include the information about the ambient environment of the vehicle. A source MAC address may be a MAC address of the laser-induced detection and ranging sensor. A destination MAC address may be a MAC address of the mobile data center. The first ring node may prestore the MAC address of the laser-induced detection and ranging sensor. For another ring node, it may be considered that the received first data packet is sent by the first ring node.

S802. The first ring node determines a first ring port.

In some embodiments, the first ring node may first query a ring departure service forwarding table based on the destination MAC address, to determine a port for forwarding the first data packet. For a detailed explanation of the ring departure service forwarding table, refer to a description in S302. Details are not described again.

In some embodiments, a MAC address in the ring departure service forwarding table stored by the first ring node is a MAC address of a node connected to the first ring node. It is assumed that the first ring node is not connected to the mobile data center, and the first ring node fails to determine, by querying the ring departure service forwarding table based on the destination MAC address, a port for forwarding the first data packet. Therefore, the first ring node queries a ring port forwarding table.

In some other embodiments, when the first data packet is a multicast packet, and needs to be transmitted to a ring node that is not connected to the first ring node, a port for forwarding the first data packet may not be determined by querying the ring departure service forwarding table based on the destination MAC address, either.

In this embodiment, it is assumed that the first ring node queries the ring departure service forwarding table and fails to determine a port for forwarding the first data packet, and the first ring node queries the ring port forwarding table based on the first service port, to determine a port for forwarding the first data packet. For a detailed explanation of the ring port forwarding table, refer to a description in S302. Details are not described again.

In this embodiment, it is assumed that the first ring node queries the ring port forwarding table based on the first service port, and determines the first ring port, corresponding to the first service port, of the first ring node. The first ring port is a port through which the first ring node is to send the first data packet, and the first ring node includes the first ring port.

S803. The first ring node forwards the first data packet through the first ring port.

S804. The second ring node receives the first data packet through a second ring port.

In some embodiments, no other ring node exists between the first ring node and the second ring node, that is, the second ring port of the second ring node is connected to the first ring port of the first ring node. The first data packet is not forwarded by another ring node, and the second ring node receives, through the second ring port, the first data packet that is forwarded by the first ring node through the first ring port.

In some other embodiments, another ring node exists between the first ring node and the second ring node, that is, the second ring port of the second ring node is not directly connected to the first ring port of the first ring node. The first data packet is forwarded by the another ring node, and the second ring node receives the first data packet through the second ring port.

S805. The second ring node determines that the source MAC address is different from a MAC address of the second ring node.

Because the source MAC address is the MAC address of the laser-induced detection and ranging sensor, the source MAC address is different from the MAC address of the second ring node.

S806. The second ring node determines a third ring port based on the second ring port.

In some embodiments, the second ring node may first query a ring departure service forwarding table based on the destination MAC address, to determine a port for forwarding the first data packet.

A MAC address in the ring departure service forwarding table stored by the second ring node is a MAC address of a node connected to the second ring node. It is assumed that the second ring node is not connected to the mobile data center, and the second ring node fails to determine, by querying the ring departure service forwarding table based on the destination MAC address, a port for forwarding the first data packet. Therefore, the second ring node queries a ring port forwarding table.

In this embodiment, it is assumed that the second ring node queries the ring departure service forwarding table, and fails to determine a port for forwarding the first data packet. The second ring node may query the ring port forwarding table based on the second ring port, and determine the third ring port corresponding to the second ring port. The second ring node includes the third ring port. The third ring port is a port through which the second ring node is to send the first data packet. S807 is performed.

However, the second ring node detects that the link between the second ring node and the third ring node on the third ring port is faulty, and S807 to S819 are performed. The second ring node and the third ring node may be connected through the third ring port.

S807. The second ring node determines that the first data packet is a non-wrapped data packet.

In some embodiments, the second ring node may determine, based on a value of the wrapped field, whether the first data packet is a wrapped data packet. In this embodiment, it is assumed that the value of the wrapped field is a first value, and it is determined that the first data packet is a non-wrapped data packet.

S808. The second ring node determines the second ring port based on the third ring port.

In some embodiments, the third ring port controls a sending unit of the third ring port to connect to a receiving unit of the third ring port, which indicates that the third ring port is switched into a port that receives the first data packet. A loopback occurrence point may be located at a MAC layer of the ring port.

Then, the second ring node may query the ring port forwarding table based on the third ring port, to determine the second ring port, corresponding to the third ring port, of the second ring node.

S809. The second ring node generates a second data packet.

In some embodiments, the first data packet includes the wrapped field, and the value of the wrapped field is set to a second value, to obtain the second data packet. The second data packet is a wrapped data packet of the first data packet.

It should be noted that a sequence of steps in the data transmission method provided in this embodiment of this application may be properly adjusted, or steps may be correspondingly added or subtracted based on a situation. For example, a sequence between S808 and S809 may be interchanged, that is, the second data packet may be generated first, and then the second ring port is determined based on the third ring port. Any variation to the method that can be easily figured out by a person skilled in the art within the technical scope disclosed in this application shall fall within the protection scope of this application. Therefore, details are not described again.

S810. The second ring node forwards the second data packet through the second ring port.

S811. The first ring node receives the second data packet through the first ring port.

S812. The first ring node determines that the source MAC address is the same as the MAC address of the first ring node.

In some embodiments, that the first ring node determines that the source MAC address is the same as the MAC address of the first ring node may mean that the source MAC address is the same as a MAC address of a data source device connected to the first ring node.

In this embodiment, the source MAC address included in the second data packet is the MAC address of the laser-induced detection and ranging sensor, and the first ring node may prestore the MAC address of the laser-induced detection and ranging sensor. Therefore, the first ring node may consider that the MAC address of the laser-induced detection and ranging sensor is the MAC address of the first ring node, and the received second data packet is a data packet sent by the first ring node.

S813. The first ring node determines that the second data packet is a wrapped data packet.

In some embodiments, the first ring node may determine, based on the value of the wrapped field, whether the second data packet is a wrapped data packet. In this embodiment, it is assumed that the value of the wrapped field is the second value, and it is determined that the second data packet is a wrapped data packet.

S814. The first ring node determines a fourth ring port based on the first ring port.

In some embodiments, the first ring node may first query the ring departure service forwarding table based on the destination MAC address, to determine a port for forwarding the second data packet.

The MAC address in the ring departure service forwarding table stored by the first ring node is the MAC address of the node connected to the first ring node. It is assumed that the first ring node is not connected to the mobile data center, and the first ring node fails to determine, by querying the ring departure service forwarding table based on the destination MAC address, a port for forwarding the second data packet. Therefore, the first ring node queries the ring port forwarding table.

In this embodiment, it is assumed that the first ring node queries the ring departure service forwarding table, and fails to determine a port for forwarding the second data packet. The first ring node may query the ring port forwarding table based on the first ring port, and determine the fourth ring port corresponding to the first ring port. The first ring node includes the fourth ring port. The fourth ring port is a port through which the first ring node is to send the second data packet. S815 is performed.

S815. The first ring node forwards the second data packet through the fourth ring port.

In some embodiments, the first ring node determines that the source MAC address is the same as the MAC address of the first ring node, and determines that the second data packet is a non-wrapped data packet. The second data packet may be a multicast packet, and the first ring node discards the second data packet.

S816. The third ring node receives the second data packet through a fifth ring port.

In some embodiments, no other ring node exists between the third ring node and the first ring node, that is, the fourth ring port of the first ring node is connected to the fifth ring port of the third ring node. The second data packet is not forwarded by another ring node, and the third ring node receives, through the fifth ring port, the second data packet that is forwarded by the first ring node through the fourth ring port.

In some other embodiments, another ring node exists between the third ring node and the first ring node, that is, the fourth ring port of the first ring node is not directly connected to the fifth ring port of the third ring node. The second data packet is forwarded by the another ring node, and the third ring node receives the first data packet through the fifth ring port. After receiving the second data packet, the another ring node may forward the second data packet with reference to the description of forwarding the second data packet by the second ring node in S307 to S310.

S817. The third ring node determines that the source MAC address is different from a MAC address of the third ring node.

Because the source MAC address is the MAC address of the laser-induced detection and ranging sensor, the source MAC address is different from the MAC address of the third ring node.

S818. The third ring node determines a second service port.

In some embodiments, the third ring node may first query a ring departure service forwarding table based on the destination MAC address, to determine a port for forwarding the second data packet.

A MAC address in the ring departure service forwarding table stored by the third ring node is a MAC address of a node connected to the third ring node. It is assumed that the third ring node is connected to the mobile data center, and the third ring node queries the ring departure service forwarding table based on the destination MAC address, and determines the second service port. The second service port is a port for forwarding the second data packet. S819 is performed.

S819. The third ring node forwards the second data packet through the second service port.

Further, the third ring node detects that the link between the third ring node and the second ring node is faulty, and S820 and S821 are performed. The third ring node may be connected to the third ring port of the second ring node through a sixth ring port. The third ring node may detect that the link between the third ring node and the second ring node on the sixth ring port is faulty.

S820. The third ring node determines that the second data packet is a wrapped data packet.

In some embodiments, the third ring node may determine, based on the value of the wrapped field, whether the second data packet is a wrapped data packet. In this embodiment, it is assumed that the value of the wrapped field is the second value, and it is determined that the second data packet is a wrapped data packet.

S821. The third ring node discards the second data packet.

S822. The mobile data center receives the second data packet, where the second data packet includes the information about the ambient environment of the vehicle.

S823. The mobile data center determines a decision in a driving process of the vehicle based on the information about the ambient environment of the vehicle.

Decisions in a driving process of the vehicle include, but are not limited to, acceleration, deceleration, turning, lane changing, and stopping action decisions.

In the data transmission method provided in this embodiment of this application, when a single-point link fault occurs in a ring Ethernet-based in-vehicle network, a data packet is allowed to be further transmitted in the in-vehicle network through wrapping, so that the data packet can be further transmitted to a destination device, thereby improving reliability of data transmission in the ring Ethernet-based in-vehicle network. In addition, when a data packet received by a ring node on which a single-point link fault occurs is a wrapped data packet, it indicates that the data packet has been wrapped once, and the data packet is discarded.

Figure 9:
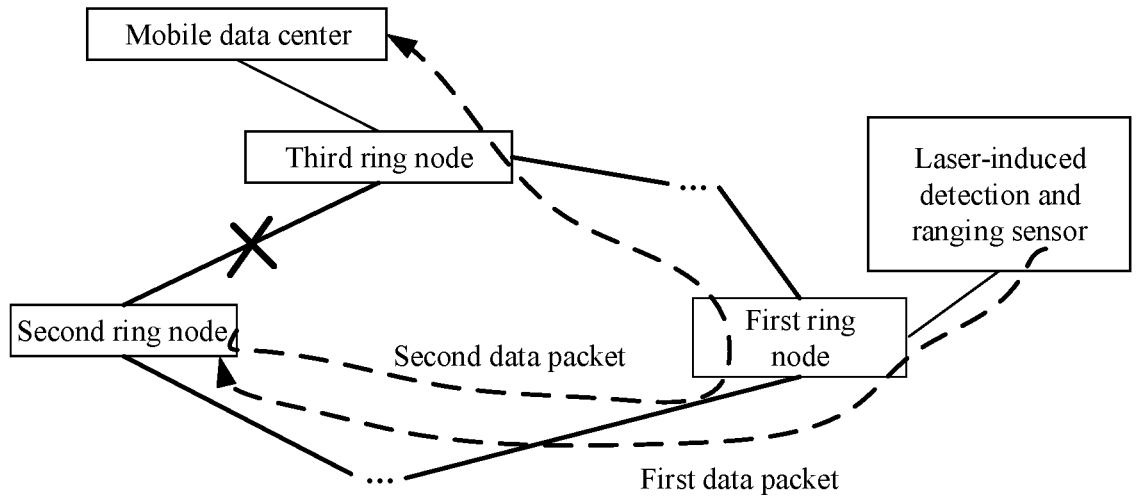
FIG. 9 is an example diagram of data transmission of another ring Ethernet-based in-vehicle network according to an embodiment of this application.

FIG. 9 is an example diagram of data transmission of another ring Ethernet-based in-vehicle network according to an embodiment of this application. As shown in the figure, a second ring node is connected to a third ring node in a clockwise direction, and the second ring node is connected to the third ring node in a counter-clockwise direction through at least one ring node. A link between the second ring node and the third ring node is faulty. A mobile data center is connected to the third ring node. A laser-induced detection and ranging sensor is connected to a first ring node. After receiving a first data packet sent by the laser-induced detection and ranging sensor, the first ring node needs to transmit the first data packet to the mobile data center through the second ring node in the clockwise direction. After receiving the first data packet, the second ring node detects that the link between the second ring node and the third ring node is faulty, and the second ring node wraps the first data packet to obtain a second data packet, and forwards the second data packet through the first ring node and the third ring node, to transmit the second data packet to the mobile data center. For specific explanations, refer to the descriptions in the foregoing embodiments. Details are not described herein again.

Next, the data transmission method for a single-point link fault is illustrated with reference to an accompanying drawing.

Figure 10:
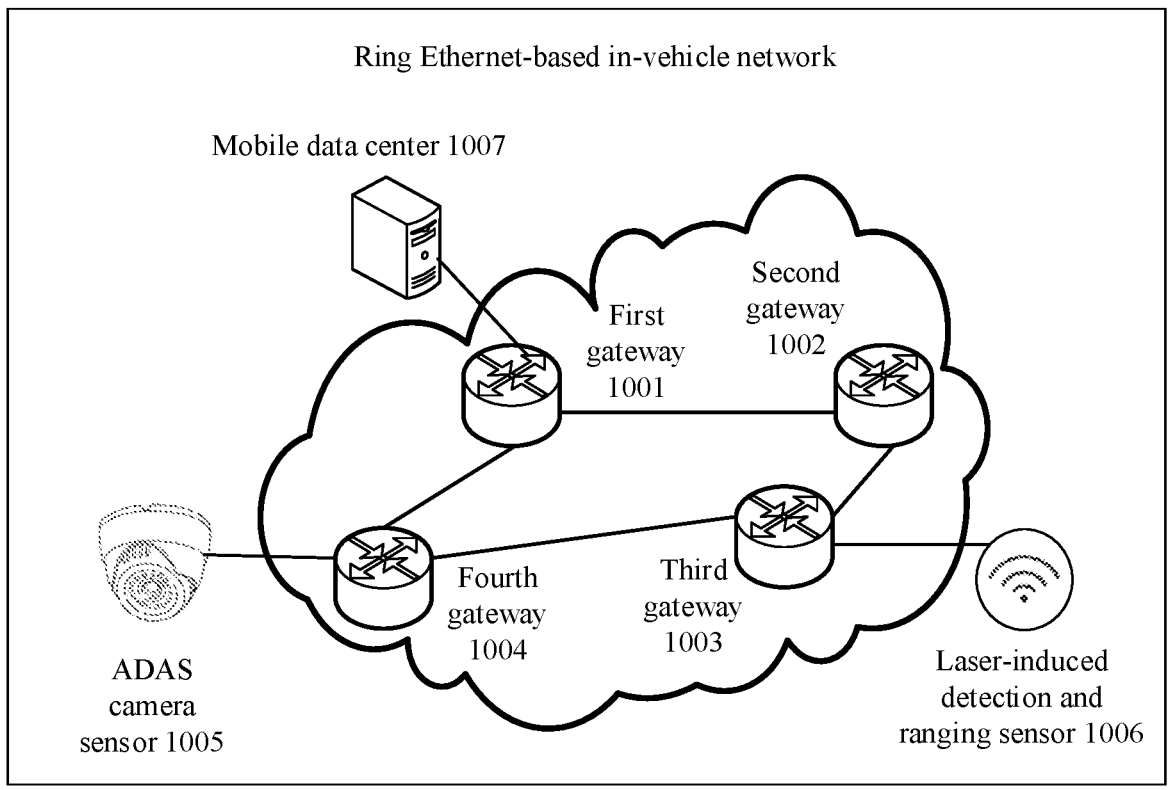
FIG. 10 is an example diagram of an architecture of another ring Ethernet-based in-vehicle network according to this application.

FIG. 10 is an example diagram of an architecture of a ring Ethernet-based in-vehicle network that may be applied to an embodiment of this application. Herein, that a ring node is a gateway is used as an example for description. As shown in FIG. 10, the in-vehicle network includes a first gateway 1001, a second gateway 1002, a third gateway 1003, a fourth gateway 1004, a data source device (for example, an ADAS camera sensor 1005 and a laser-induced detection and ranging sensor 1006), and a mobile data center 1007. The four gateways are sequentially connected end to end to form a ring network topology. Two adjacent gateways are connected through a ring port of a 10 Gbps rate. Each ring port is an automotive-grade 10GBASE-T1 port. As shown in FIG. 10, a ring port rB included in the first gateway 1001 is connected to a ring port rA included in the second gateway 1002, a ring port rB included in the second gateway 1002 is connected to a ring port rA included in the third gateway 1003, a ring port rB included in the third gateway 1003 is connected to a ring port rA included in the fourth gateway 1004, and a ring port rB included in the fourth gateway 1004 is connected to a ring port rA included in the first gateway 1001.

In some embodiments, the first gateway 1001 and the second gateway 1002 are located at positions of a front. For example, the first gateway 1001 is located at a right position of the front, and the second gateway 1002 is located at a left position of the front. The third gateway 1003 and the fourth gateway 1004 are located at positions of a rear.

Each of the ADAS camera sensor 1005, the laser-induced detection and ranging sensor 1006, and the mobile data center 1007 is connected to a gateway nearby based on a position in a vehicle body. After connected to a gateway, real-time service data collected by each sensor is transmitted on the ring network in a clockwise direction. In a normal case without faults, service traffic is transmitted only in the clockwise direction.

For example, as shown in FIG. 10, the mobile data center 1007 is connected to the first gateway 1001. The ADAS camera sensor 1005 is connected to the fourth gateway 1004. Real-time data collected by the ADAS camera sensor 1005 is transmitted into the ring network through the fourth gateway 1004. The fourth gateway 1004 transmits the data to the first gateway 1001 in the clockwise direction, and the data is forwarded by the first gateway 1001 to the mobile data center 1007. The mobile data center 1007 may make, based on the real-time data (information about an ambient environment of a vehicle) collected by the ADAS camera sensor 1005, various decisions in a driving process of the vehicle, including but not limited to acceleration, deceleration, turning, lane changing, stopping, and other action decisions. The laser-induced detection and ranging sensor 1006 is connected to the third gateway 1003. Real-time data collected by the laser-induced detection and ranging sensor 1006 is transmitted into the ring network through the third gateway 1003. The third gateway 1003 transmits the data to the fourth gateway 1004 in the clockwise direction, and the data is forwarded by the fourth gateway 1004 to the first gateway 1001, and then forwarded by the first gateway 1001 to the mobile data center 1007. The mobile data center 1007 may determine, based on the real-time data (information about various obstacles around the rear of the vehicle) collected by the laser-induced detection and ranging sensor 1006, whether an obstacle that affects reversing of the vehicle exists behind the vehicle, and make various decisions in a driving process of the vehicle, including but not limited to driving decisions on driving actions such as braking and stepping on an accelerator.

In some embodiments, the gateway includes a service port, and the data source device may be connected to the gateway through the service port. Data is transmitted between the data source device and the gateway through the service port.

For example, it is assumed that the first gateway 1001, the second gateway 1002, the third gateway 1003, and the fourth gateway 1004 each include the service port C, the service port D, the service port E, and the service port F shown in FIG. 2.

The mobile data center 1007 may be connected to the first gateway 1001 through any one of the service port C, the service port D, the service port E, and the service port F.

The ADAS camera sensor 1005 may be connected to the fourth gateway 1004 through any one of the service port C, the service port D, the service port E, and the service port F.

The laser-induced detection and ranging sensor 1006 may be connected to the third gateway 1003 through any one of the service port C, the service port D, the service port E, and the service port F.

In a first possible scenario, it is assumed that the ADAS camera sensor 1005 is connected to the service port C of the fourth gateway 1004. The ADAS camera sensor 1005 collects the information about the ambient environment of the vehicle. The fourth gateway 104 receives the information about the ambient environment of the vehicle through the service port C, and needs to transmit the information about the ambient environment of the vehicle to the mobile data center 1007. A link between the first gateway 1001 and the fourth gateway 1004 is faulty.

In some embodiments, a first data packet sent by the ADAS camera sensor and received by the fourth gateway may be an Ethernet frame defined in IEEE 802.3.

After the fourth gateway receives the first data packet sent by the ADAS camera sensor, the fourth gateway may extend the first data packet, and rewrite an IEEE 802.3 Ethernet frame format into an IEEE 802.1cb Ethernet frame format. In some embodiments, a wrapped field is added to the Ethernet frame.

For detailed explanations of the Ethernet frame, the IEEE 802.1cb Ethernet frame format, and the first data packet, refer to descriptions in S301. Details are not described again.

It should be noted that the first data packet may further include the information about the ambient environment of the vehicle. A source MAC address may be a MAC address of the ADAS camera sensor. A destination MAC address may be a MAC address of the mobile data center. The fourth gateway may prestore the MAC address of the ADAS camera sensor. For another gateway, it may be considered that the received first data packet is sent by the fourth gateway.

The fourth gateway may first query a ring departure service forwarding table based on the destination MAC address, to determine a port for forwarding the first data packet. When failing to obtain a port for forwarding the first data packet, the fourth gateway queries a ring port forwarding table based on the service port C, to determine the ring port rB, corresponding to the service port C, of the fourth gateway. For details, refer to a description in S302. Details are not described again.

When the fourth gateway detects that the link between the fourth gateway and the first gateway is faulty, the fourth gateway determines that the first data packet is a non-wrapped data packet, and then the fourth gateway controls a sending unit of the ring port rB to connect to a receiving unit of the ring port rB, which indicates that the ring port rB is switched into a port that receives the first data packet. The fourth gateway queries the ring port forwarding table based on the ring port rB, to determine the ring port rA, corresponding to the ring port rB, of the fourth gateway.

The fourth gateway generates a second data packet, and forwards the second data packet through the ring port rA of the fourth gateway.

After receiving the second data packet through the ring port rB of the third gateway, the third gateway determines that the source MAC address is different from a MAC address of the third gateway. Then, the third gateway queries a ring port forwarding table based on the ring port rB, to determine the ring port rA corresponding to the ring port rB, and forwards the second data packet through the ring port rA of the third gateway.

Similarly, after receiving the second data packet through the ring port rB of the second gateway, the second gateway determines that the source MAC address is different from a MAC address of the second gateway. Then, the second gateway queries a ring port forwarding table based on the ring port rB, to determine the ring port rA corresponding to the ring port rB, and forwards the second data packet through the ring port rA of the second gateway.

The second data packet is transmitted in a counter-clockwise direction, and the second data packet is transmitted to the first gateway through the third gateway and the second gateway.

After receiving the second data packet through the ring port rB of the first gateway, the first gateway determines that the source MAC address is different from a MAC address of the first gateway. Then, the first gateway queries a ring departure service forwarding table based on the destination MAC address to determine a second service port, and forwards the second data packet to the mobile data center through the second service port of the first gateway.

After receiving the second data packet through the second service port, the mobile data center determines a decision in a driving process of the vehicle based on the information about the ambient environment of the vehicle. The second data packet includes the information about the ambient environment of the vehicle.

When the first gateway detects that the link between the first gateway and the fourth gateway is faulty, the first gateway determines that the second data packet is a wrapped data packet, and discards the second data packet.

In a second possible scenario, it is assumed that the laser-induced detection and ranging sensor 1006 is connected to the service port C of the third gateway 1003. The laser-induced detection and ranging sensor 1006 collects the information about the ambient environment of the vehicle. The third gateway 1003 receives the information about the ambient environment of the vehicle through the service port C, and needs to transmit the information about the ambient environment of the vehicle to the mobile data center 1007. A link between the first gateway 1001 and the fourth gateway 1004 is faulty.

In some embodiments, a first data packet sent by the laser-induced detection and ranging sensor and received by the third ring gateway may be an Ethernet frame defined in IEEE 802.3.

After the third gateway receives the first data packet sent by the laser-induced detection and ranging sensor, the third gateway may extend the first data packet, and rewrite an IEEE 802.3 Ethernet frame format into an IEEE 802.1cb Ethernet frame format. In some embodiments, a wrapped field is added to the Ethernet frame.

For detailed explanations of the Ethernet frame, the IEEE 802.1cb Ethernet frame format, and the first data packet, refer to descriptions in S301. Details are not described again.

The third gateway may first query a ring departure service forwarding table based on a destination MAC address, to determine a port for forwarding the first data packet. When failing to obtain a port for forwarding the first data packet, the third gateway queries a ring port forwarding table based on the service port C, to determine the ring port rB, corresponding to the service port C, of the third gateway, and forwards the first data packet through the ring port rB. For details, refer to a description in S302. Details are not described again.

After receiving the first data packet through the ring port rA of the fourth gateway, the fourth gateway determines that a source MAC address is different from a MAC address of the fourth gateway. Then, the fourth gateway queries a ring port forwarding table based on the ring port rA, to determine the ring port rB corresponding to the ring port rA.

When the fourth gateway detects that the link between the fourth gateway and the first gateway is faulty, the fourth gateway determines that the first data packet is a non-wrapped data packet, and then the fourth gateway controls a sending unit of the ring port rB to connect to a receiving unit of the ring port rB, which indicates that the ring port rB is switched into a port that receives the first data packet. A loopback occurrence point may be located at a MAC layer of the ring port. The fourth gateway queries the ring port forwarding table based on the ring port rB, to determine the ring port rA, corresponding to the ring port rB, of the fourth gateway.

The fourth gateway generates a second data packet, and forwards the second data packet through the ring port rA of the fourth gateway.

After receiving the second data packet through the ring port rB of the third gateway, the third gateway determines that the source MAC address is the same as a MAC address of the third gateway, and determines that the second data packet is a wrapped data packet. Then, the third gateway queries a ring port forwarding table based on the ring port rB, to determine the ring port rA corresponding to the ring port rB, and forwards the second data packet through the ring port rA of the third gateway.

After receiving the second data packet through the ring port rB of the second gateway, the second gateway determines that the source MAC address is different from a MAC address of the second gateway. Then, the second gateway queries a ring port forwarding table based on the ring port rB, to determine the ring port rA corresponding to the ring port rB, and forwards the second data packet through the ring port rA of the second gateway.

The second data packet is transmitted in a counter-clockwise direction, and the second data packet is transmitted to the first gateway through the third gateway and the second gateway.

After receiving the second data packet through the ring port rB of the first gateway, the first gateway determines that the source MAC address is different from a MAC address of the first gateway. Then, the first gateway queries a ring departure service forwarding table based on the destination MAC address to determine a second service port, and forwards the second data packet to the mobile data center through the second service port of the first gateway.

After receiving the second data packet through the second service port, the mobile data center determines a decision in a driving process of the vehicle based on the information about the ambient environment of the vehicle. The second data packet includes the information about the ambient environment of the vehicle.

When the first gateway detects that the link between the first gateway and the fourth gateway is faulty, the first gateway determines that the second data packet is a wrapped data packet, and discards the second data packet.

In the data transmission method provided in the embodiments of this application, when a single-point link fault occurs in a ring Ethernet-based in-vehicle network, a service traffic transmission service can still be provided. When a link between two adjacent ring nodes is faulty, after wrapping is performed once on one ring node, it can still be ensured that a data packet is transmitted in the ring network in a counter-clockwise direction to a mobile data center, thereby improving reliability of data transmission in the ring Ethernet-based in-vehicle network. For example, the link between the first gateway and the fourth gateway is faulty. After wrapping is performed once on the fourth gateway, it can still be ensured that a data packet is transmitted in the ring network in the counter-clockwise direction to the mobile data center.

In a conventional technology, a ring network is provided with a mechanism in which a source node eliminates a packet sent by the source node, that is, if the source node determines that a source MAC address of a received data packet matches a MAC address configured by the source node, the source node terminates the data packet. However, in the data transmission method provided in the embodiments of this application, after a first data packet is wrapped, after a source ring node receives the data packet sent by the source ring node, when determining that the data packet is a wrapped packet, the source ring node may further transmit the data packet to another ring node. For example, the second data packet looped back from the fourth gateway reaches the third gateway, and the third gateway determines that the second data packet is a wrapped data packet, and further transmits the second data packet to the second gateway. In the ring network, the mechanism in which the source node performs elimination is retained, which can reduce unnecessary bandwidth waste and avoid a broadcast storm.

In some embodiments, if the single-point link fault is withdrawn, the ring node may control the ring node to withdraw a port loopback. For example, the first ring port controls the sending unit of the first ring port to disconnect from the receiving unit of the first ring port.

In some embodiments, after receiving a data packet, the ring node forwards the data packet through two outbound ports. Both the two outbound ports may be ring ports, or one may be a ring port, and the other may be a service port. This is not limited in this application. In some embodiments, the ring node may replicate and send a data packet according to an IEEE 802.1cb standard protocol. For example, whether to forward the data packet through two outbound ports is determined based on at least one of a VLAN ID, a destination MAC address, a source MAC address, and a CoS in a VLAN tag header.

The ring node may prestore a 1 cb forwarding table. After receiving the data packet, the ring node queries the dual-feed forwarding table. If a dual-feed result is obtained, the ring node forwards the data packet through two outbound ports. The dual-feed forwarding table is used to replicate a data packet transmitted into the ring network and send the data packet to two specified ports. Entries in the dual-feed forwarding table may be statically configured.

For example, as shown in Table 3, a correspondence between a dual-feed condition and an outbound port may be presented in a form of a table. In other words, Table 3 presents a correspondence between a dual-feed condition and an outbound port.

TABLE 3

Dual-feed forwarding table

| | Dual-feed condition | | |
|---|---|---|---|
| Inbound port | Source MAC address | VLAN tag | Outbound port |
| C | d8:49:0b:c9:d9:a8 | 3 | rA, rB |
| D | d8:49:0b:c9:d9:a9 | 5 | rA, C |
| F | d8:49:0b:c9:d9:aa | 0 | rB, E |

As shown in Table 1, when any one of an inbound port, a source MAC address, and a VLAN identifier of the data packet meets a value of the inbound port, a value of the source MAC address, and a value of the VLAN that are shown in Table 3, the data packet is forwarded through two outbound ports.

For example, when the inbound port is the service port C, the data packet is forwarded through the ring port rA and the ring port rB.

For another example, when the inbound port is the service port C and the source MAC address is d8:49:0b:c9:d9:a8, the data packet is forwarded through the ring port rA and the ring port rB.

For another example, when the inbound port is the service port C, the source MAC address is d8:49:0b:c9:d9:a8, and the VLAN identifier is 3, the data packet is forwarded through the ring port rA and the ring port rB.

It should be noted that Table 3 merely shows, in a form of a table, a storage form of the correspondence between a dual-feed condition and an outbound port in a storage device, but does not limit the storage form of the correspondence between a dual-feed condition and an outbound port in the storage device. Certainly, the storage form of the correspondence between a dual-feed condition and an outbound port in the storage device may alternatively be another storage form. This is not limited in this embodiment of this application.

In some embodiments, it is assumed that the first ring node is connected to the data source device and the mobile data center. After collecting information about an ambient environment of a vehicle, the data source device sends the first data packet to the first ring node. After receiving the first data packet, the first ring node may directly transmit the first data packet to the mobile data center without forwarding by another ring node. The mobile data center makes a decision in a driving process of the vehicle based on the received information about the ambient environment of the vehicle. Specifically, the first ring node may query the ring departure service forwarding table based on the destination MAC address, to determine a service port, connected to the mobile data center, of the first ring node, and forward the first data packet to the mobile data center through the service port of the first ring node. The first data packet includes the destination MAC address.

In other embodiments, the mobile data center may be connected to at least one ring node. When receiving two same data packets, the mobile data center may select one from the two same data packets for processing, and discard the other data packet.

In some other embodiments, the real-time data collected by the data source device may also be transmitted through a ring node to another device other than the mobile data center. For a specific data transmission method, refer to descriptions in the foregoing embodiments. Details are not described again.

In the foregoing embodiments provided in this application, the methods provided in the embodiments of this application are respectively described from perspectives of the ring node and interaction between the ring node and the mobile data center. It may be understood that, to implement functions in the methods provided in the embodiments of this application, each network element, for example, the ring node, includes a corresponding hardware structure and/or software module for performing the functions. A person of ordinary skill in the art should easily be aware that, in combination with the examples described in the embodiments disclosed in this specification, algorithm steps may be implemented by hardware or a combination of hardware and computer software in this application. Whether a function is performed by hardware or hardware driven by computer software depends on particular applications and design constraint conditions of the technical solutions. A person skilled in the art may use different methods to implement the described functions of each particular application, but it should not be considered that the implementation goes beyond the scope of this application.

In the embodiments of this application, the ring node may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that module division in the embodiments of this application is an example, and is merely a logical function division. During actual implementation, another division manner may be used.

Figure 11:
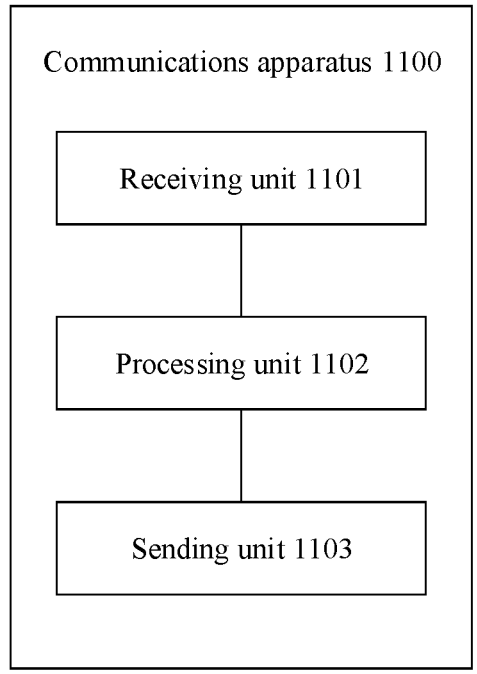
FIG. 11 is a schematic composition diagram of a communications apparatus according to this application.

When various function modules are obtained through division based on various corresponding functions, FIG. 11 is a possible schematic composition diagram of the communications apparatus in the foregoing embodiments. The communications apparatus can perform the steps performed by the ring node in any one of the method embodiments of this application. For example, the communications apparatus 1100 may include a receiving unit 1101, a processing unit 1102, and a sending unit 1103. The communications apparatus 1100 is configured to implement functions of the ring node in the method embodiment shown in FIG. 3A and FIG. 3B, or FIG. 8A and FIG. 8B, and therefore, can also achieve beneficial effects of the method embodiment. The communications apparatus 1100 is a ring node or a communications apparatus supporting the ring node in implementing the method provided in the foregoing embodiment. For example, the communications apparatus may be a chip system.

When the communications apparatus 1100 is configured to implement functions of the first ring node in the method embodiment shown in FIG. 3A and FIG. 3B, the receiving unit 1101 is configured to perform or support the communications apparatus in performing S301, the processing unit 1102 is configured to perform or support the communications apparatus in performing S302 to S305, and the sending unit 1103 is configured to perform or support the communications apparatus in performing S306.

When the communications apparatus 1100 is configured to implement functions of the second ring node in the method embodiment shown in FIG. 3A and FIG. 3B, the receiving unit 1101 is configured to perform or support the communications apparatus in performing S307, the processing unit 1102 is configured to perform or support the communications apparatus in performing S308 and S309, and the sending unit 1103 is configured to perform or support the communications apparatus in performing S310.

When the communications apparatus 1100 is configured to implement functions of the third ring node in the method embodiment shown in FIG. 3A and FIG. 3B, the receiving unit 1101 is configured to perform or support the communications apparatus in performing S311, the processing unit 1102 is configured to perform or support the communications apparatus in performing S312, S313, S315, and S316, and the sending unit 1103 is configured to perform or support the communications apparatus in performing S314.

When the communications apparatus 1100 is configured to implement functions of the first ring node in the method embodiment shown in FIG. 8A and FIG. 8B, the receiving unit 1101 is configured to perform or support the communications apparatus in performing S801 and S811, the processing unit 1102 is configured to perform or support the communications apparatus in performing S802 and S812 to S814, and the sending unit 1103 is configured to perform or support the communications apparatus in performing S803 and S815.

When the communications apparatus 1100 is configured to implement functions of the second ring node in the method embodiment shown in FIG. 8A and FIG. 8B, the receiving unit 1101 is configured to perform or support the communications apparatus in performing S804, the processing unit 1102 is configured to perform or support the communications apparatus in performing S805 to S809, and the sending unit 1103 is configured to perform or support the communications apparatus in performing S810.

When the communications apparatus 1100 is configured to implement functions of the third ring node in the method embodiment shown in FIG. 8A and FIG. 8B, the receiving unit 1101 is configured to perform or support the communications apparatus in performing S816, the processing unit 1102 is configured to perform or support the communications apparatus in performing S817, S818, S820, and S821, and the sending unit 1103 is configured to perform or support the communications apparatus in performing S819.

It should be noted that all related content of the steps in the foregoing method embodiments may be cited in function descriptions of corresponding function modules. Details are not described herein again.

The communications apparatus provided in this embodiment of this application is configured to perform the method in any one of the foregoing embodiments, and therefore a same effect can be achieved as that of the methods in the foregoing embodiments.

Figure 12:
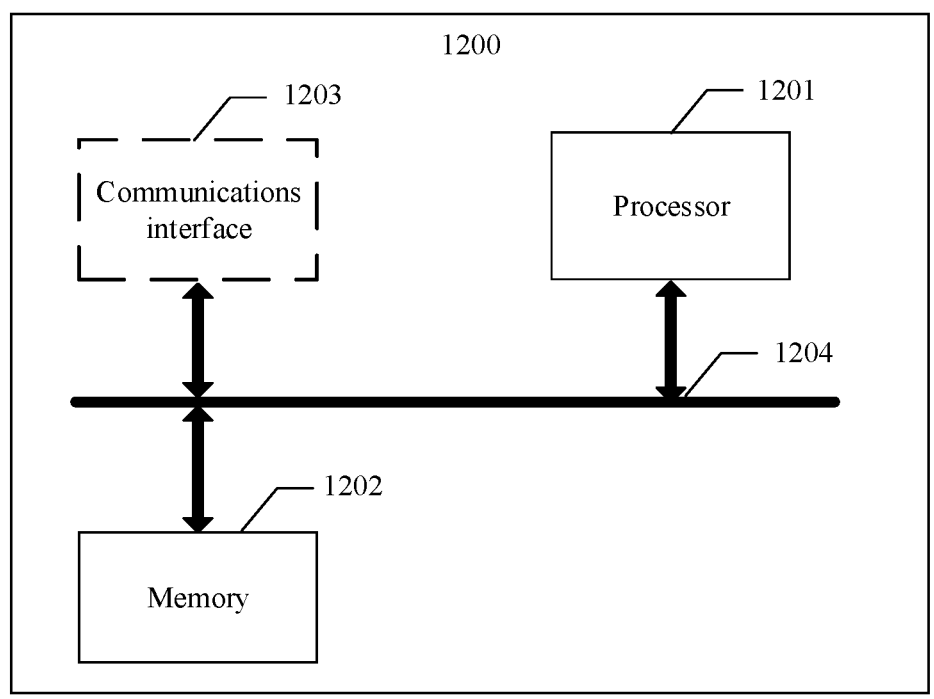
FIG. 12 is a schematic composition diagram of another communications apparatus according to this application.

FIG. 12 shows a communications apparatus 1200 according to an embodiment of this application. The communications apparatus 1200 is configured to implement functions of the ring node in the foregoing method. The communications apparatus 1200 may be a ring node, or may be an apparatus in the ring node. The communications apparatus 1200 may be a chip system. In this embodiment of this application, the chip system may include a chip, or may include a chip and another discrete component.

The communications apparatus 1200 includes at least one processor 1201, configured to implement functions of the ring node in the method provided in the embodiments of this application. For example, the processor 1201 may be configured to determine that a first data packet is a non-wrapped data packet, determine a second ring port based on a first ring port, generate a second data packet, where the first ring port is a port through which the ring node is to send the first data packet, and the like. For details, refer to detailed descriptions in the method example. Details are not described herein again.

The communications apparatus 1200 may further include at least one memory 1202, configured to store program instructions and/or data. The memory 1202 is coupled to the processor 1201. Coupling in this embodiment of this application may be indirect coupling or a communication connection between apparatuses, units, or modules in an electrical form, a mechanical form, or another form, and is used for information exchange between the apparatuses, the units, or the modules. The processor 1201 may cooperate with the memory 1202. The processor 1201 may execute the program instructions stored in the memory 1202. At least one of the at least one memory may be included in the processor.

The communications apparatus 1200 may further include a communications interface 1203, configured to communicate with another device by using a transmission medium, so that an apparatus used in the communications apparatus 1200 may communicate with the another device. For example, if the communications apparatus is a network device, the another device is a terminal device. If the communications apparatus is a terminal device, the another device is a network device. The processor 1201 sends and receives data by using the communications interface 1203, and is configured to implement the method performed by the ring node in the embodiments corresponding to FIG. 3A and FIG. 3B, and FIG. 8A and FIG. 8B.

In this embodiment of this application, a specific connection medium among the communications interface 1203, the processor 1201, and the memory 1202 is not limited. In this embodiment of this application, the communications interface 1203, the processor 1201, and the memory 1202 are connected by using a bus 1204 in FIG. 12. The bus is represented by using a thick line in FIG. 12. A connection manner of other components is merely schematically described and is not restrictive. The bus may be classified into an address bus, a data bus, a control bus, and the like. For ease of representation, only one thick line is used to represent the bus in FIG. 12, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly presented as being performed and completed by a hardware processor, or performed and completed by a combination of hardware and a software module in the processor.

It may be understood that the processor in the embodiments of this application may be a central processing unit (Central Processing Unit, CPU), another general-purpose processor, a digital signal processor (Digital Signal Processor, DSP), an application-specific integrated circuit (Application Specific Integrated Circuit, ASIC), a field programmable gate array (Field Programmable Gate Array, FPGA), another programmable logic device, a transistor logic device, a hardware component, or any combination thereof. The general-purpose processor may be a microprocessor or any conventional processor.

In the embodiments of this application, the memory may be a non-volatile memory, a hard disk drive (hard disk drive, HDD) or a solid-state drive (solid-state drive, SSD), or may be a volatile memory (volatile memory), for example, a random access memory (random-access memory, RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store program instructions and/or data.

The foregoing description about the implementations allows a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely an example. For example, the division into the modules or units is merely logical function division, and there may be another division manner during actual implementation. For example, a plurality of units or components may be combined, or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed at different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

All or a part of the methods in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, an SSD), or the like.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. In the text descriptions of this application, the character "/" usually indicates an "or" relationship between the associated objects. In a formula in this application, the character "/" indicates a "division" relationship between the associated objects.

It may be understood that various numbers in the embodiments of this application are merely used for differentiation for ease of description, and are not used to limit the scope of the embodiments of this application. Numbers of the foregoing processes do not mean an execution sequence, and the execution sequence of the processes should be determined based on functions and internal logic of the processes.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, comprising:
receiving a first data packet;
when a first ring node detects that a link between the first ring node and a second ring node on a first ring port is faulty, determining whether the first data packet is a wrapped data packet, wherein the first ring node is connected to the second ring node through the first ring port;
if the first data packet is a non-wrapped data packet, determining a second ring port based on the first ring port, wherein the first ring port is a port through which the first ring node is to send the first data packet, and wherein the determining a second ring port based on the first ring port comprises:
querying a ring port forwarding table based on the first ring port, to determine the second ring port corresponding to the first ring port, wherein the ring port forwarding table is used to indicate a correspondence between an inbound port and an outbound port, the inbound port represents a port that receives a data packet, the inbound port is a ring port or a service port, and the outbound port represents a ring port for forwarding the data packet in a ring network;
generating a second data packet, wherein the second data packet is a wrapped data packet of the first data packet; and
forwarding the second data packet through the second ring port.

2. The method according to claim 1, wherein the method further comprises:
if the first data packet is a wrapped data packet, discarding the first data packet.

3. The method according to claim 1, wherein the first data packet comprises a wrapped field, and the determining whether the first data packet is a wrapped data packet comprises:
determining, based on a value of the wrapped field, whether the first data packet is a wrapped data packet;
when the value of the wrapped field is a first value, determining that the first data packet is a non-wrapped data packet; and
when the value of the wrapped field is a second value, determining that the first data packet is a wrapped data packet.

4. The method according to claim 3, wherein the generating a second data packet comprises:
setting the value of the wrapped field to the second value to obtain the second data packet, wherein the second value is used to indicate that a data packet comprising a wrapped field whose value is the second value is a wrapped data packet.

5. The method according to claim 1, wherein after the receiving a first data packet, the method further comprises:
querying the ring port forwarding table based on a first inbound port, to determine the first ring port corresponding to the first inbound port, wherein the first inbound port is a port that receives the first data packet, and the first inbound port is a first service port or the second ring port.

6. A data transmission method, comprising:
receiving a second data packet through a third ring port, wherein the second data packet comprises a source media access control (MAC) address;
determining that the source MAC address is the same as a MAC address of a second ring node, and determining whether the second data packet is a wrapped data packet;
if the second data packet is a wrapped data packet, determining a fourth ring port based on the third ring port, and wherein the determining a fourth ring port based on the third ring port comprises:
querying a ring port forwarding table based on the third ring port, to determine the fourth ring port corresponding to the third ring port, wherein the ring port forwarding table is used to indicate a correspondence between an inbound port and an outbound port, the inbound port represents a port that receives a data packet, the inbound port is a ring port or a service port, and the outbound port represents a ring port for forwarding the data packet in a ring network; and
forwarding the second data packet through the fourth ring port.

7. The method according to claim 6, wherein the second data packet comprises a wrapped field, and the determining whether the second data packet is a wrapped data packet comprises:
determining, based on a value of the wrapped field, whether the second data packet is a wrapped data packet;
when the value of the wrapped field is a first value, determining that the second data packet is a non-wrapped data packet; and
when the value of the wrapped field is a second value, determining that the second data packet is a wrapped data packet.

8. A communications apparatus, comprising:
a receiver, configured to receive a first data packet;
a processor, configured to: when a first ring node detects that a link between the first ring node and a second ring node on a first ring port is faulty, determine whether the first data packet is a wrapped data packet, wherein the first ring node is connected to the second ring node through the first ring port, wherein
the processor is further configured to: if the first data packet is a non-wrapped data packet, determine a second ring port based on the first ring port, wherein the first ring port is a port through which the first ring node is to send the first data packet, and wherein determining the second ring port based on the first ring port comprises:
querying a ring port forwarding table based on the first ring port, to determine the second ring port corresponding to the first ring port, wherein the ring port forwarding table is used to indicate a correspondence between an inbound port and an outbound port, the inbound port represents a port that receives a data packet, the inbound port is a ring port or a service port, and the outbound port represents a ring port for forwarding the data packet in a ring network; and the processor is further configured to generate a second data packet, wherein the second data packet is a wrapped data packet of the first data packet; and a sending unit, configured to forward the second data packet through the second ring port.

9. The apparatus according to claim 8, wherein the processor is further configured to: if the first data packet is a wrapped data packet, discard the first data packet.

10. The apparatus according to claim 8, wherein the first data packet comprises a wrapped field, and the processor is configured to:
   determine, based on a value of the wrapped field, whether the first data packet is a wrapped data packet;
   when the value of the wrapped field is a first value, determine that the first data packet is a non-wrapped data packet; and
   when the value of the wrapped field is a second value, determine that the first data packet is a wrapped data packet.

11. The apparatus according to claim 10, wherein the processor is configured to:
   set the value of the wrapped field to the second value to obtain the second data packet, wherein the second value is used to indicate that a data packet comprising a wrapped field whose value is the second value is a wrapped data packet.

12. The apparatus according to claim 8, wherein the processor is further configured to:
   query the ring port forwarding table based on a first inbound port, to determine the first ring port corresponding to the first inbound port, wherein the first inbound port is a port that receives the first data packet, and the first inbound port is a first service port or the second ring port.

13. A communications apparatus, comprising:
   a receiver, configured to receive a second data packet through a third ring port, wherein the second data packet comprises a source media access control (MAC) address;
   a processor, configured to determine that the source MAC address is the same as a MAC address of a second ring node, and determine whether the second data packet is a wrapped data packet, wherein
   the processor is further configured to: if the second data packet is a wrapped data packet, determine a fourth ring port based on the third ring port, and wherein determining the fourth ring port based on the third ring port comprises:
      querying a ring port forwarding table based on the third ring port, to determine the fourth ring port corresponding to the third ring port, wherein the ring port forwarding table is used to indicate a correspondence between an inbound port and an outbound port, the inbound port represents a port that receives a data packet, the inbound port is a ring port or a service port, and the outbound port represents a ring port for forwarding the data packet in a ring network; and
   a sending unit, configured to forward the second data packet through the fourth ring port.

14. The apparatus according to claim 13, wherein the second data packet comprises a wrapped field, and the processor is configured to:
   determine, based on a value of the wrapped field, whether the second data packet is a wrapped data packet;
   when the value of the wrapped field is a first value, determine that the second data packet is a non-wrapped data packet; and
   when the value of the wrapped field is a second value, determine that the second data packet is a wrapped data packet.

* * * * *